United States Patent [19]
Roffe et al.

[11] Patent Number: 5,734,817
[45] Date of Patent: Mar. 31, 1998

[54] METHOD FOR MAKING A DATA BASE AVAILABLE TO A USER PROGRAM DURING DATA BASE RECOVERY

[75] Inventors: James Roffe, Hugo, Minn.; Gary Schlaff, Atlantic Mine, Mich.; Sheridan L. Natwick, Stillwater, Minn.

[73] Assignee: Unisys Corporation, Blue Bell, Pa.

[21] Appl. No.: 397,429

[22] Filed: Mar. 1, 1995

[51] Int. Cl.⁶ ........................................... G06F 11/00
[52] U.S. Cl. ........................... 395/182.13; 395/618
[58] Field of Search .................... 395/182.01, 182.13, 395/182.14, 616, 617, 618

[56] References Cited

U.S. PATENT DOCUMENTS

| | | | |
|---|---|---|---|
| 3,389,380 | 6/1968 | Ashbaugh et al. | 340/172.5 |
| 3,461,433 | 8/1969 | Emerson. | |
| 4,355,355 | 10/1982 | Butwell et al. | 364/200 |
| 4,521,846 | 6/1985 | Scalzi et al. | 364/200 |
| 4,819,159 | 4/1989 | Shipley | 364/200 |
| 4,825,358 | 4/1989 | Letwin | 364/200 |
| 4,825,363 | 4/1989 | Baumann et al. | 364/200 |
| 4,827,400 | 5/1989 | Dunwell et al. | 364/200 |
| 4,827,406 | 5/1989 | Bischoff et al. | 364/200 |
| 4,835,677 | 5/1989 | Sato et al. | 364/200 |
| 4,841,436 | 6/1989 | Asano et al. | 364/200 |
| 4,853,849 | 8/1989 | Bain, Jr. et al. | 364/200 |
| 4,862,349 | 8/1989 | Foreman et al. | 364/200 |
| 4,890,221 | 12/1989 | Gage | 364/200 |
| 4,903,196 | 2/1990 | Pomerene et al. | 364/200 |
| 4,933,940 | 6/1990 | Walter | 371/9.1 |
| 4,939,640 | 7/1990 | Bachman et al. | 364/200 |
| 4,979,098 | 12/1990 | Baum et al. | 364/200 |
| 5,065,311 | 11/1991 | Masai et al. | |
| 5,138,710 | 8/1992 | Kruesi | 395/575 |
| 5,193,162 | 3/1993 | Bordsen | 395/425 |
| 5,210,840 | 5/1993 | Fukagawa et al. | 395/400 |
| 5,247,664 | 9/1993 | Thomson | 395/600 |
| 5,319,773 | 6/1994 | Britton | 395/575 |
| 5,325,519 | 6/1994 | Long | 395/975 |
| 5,333,314 | 7/1994 | Masai | 395/600 |
| 5,404,508 | 4/1995 | Konrad | 395/600 |
| 5,414,840 | 5/1995 | Rengarajan et al. | 395/660 |
| 5,432,926 | 7/1995 | Citron | 395/575 |
| 5,530,800 | 6/1996 | Larsson | 395/181 |
| 5,561,798 | 10/1996 | Haderle et al. | 395/601 |

*Primary Examiner*—Albert Decady
*Attorney, Agent, or Firm*—Nawrocki, Rooney & Sivertson, P.A.

[57] ABSTRACT

A method and apparatus for allowing a user program, which has provided a global transaction to a remote system, to continue operation after only a partial recovery, thereby significantly reducing the delay associated with a detected fault or failure. The local transaction steps may be recovered by the local system. For all global transaction steps in a "ready" state, a data base management system may re-establish the data base locks and system environment variables associated therewith. Thereafter, the user programs may continue operation and may access the un-locked portion of the data base, including the portion associated with the local transactions. In the meantime, a transaction manager may determine the actual status of the global transaction steps by performing the necessary communications with the remote systems. Once the actual status of a particular global transaction step is determined by the transaction manager, the global transaction step may be recovered, and the corresponding data base locks may be released. As the transaction manager determines the actual state of the remaining global transaction steps, more of the data base may be released to the user programs. Eventually, the entire data base may be available to the user programs.

18 Claims, 19 Drawing Sheets

METHOD FOR MAKING A DATA BASE AVAILABLE TO A USER PROGRAM DURING DATA BASE RECOVERY

CROSS REFERENCE TO CO-PENDING APPLICATIONS

The present application is related to U.S. Pat. application Ser. No. 07/809,386, filed Dec. 17, 1991, entitled "Method and Apparatus for Rapidly Loading Addressing Registers", now U.S. Pat. No. 5,379,392, and U.S. patent application Ser. No. 07/762,282, filed Sep. 19, 1991, entitled "Cooperative Hardware and Microcode Control System for Pipelined Instruction Execution", now U.S. Pat. No. 5,577,259, both assigned to the assignee of the present invention and both incorporated herein by reference.

BACKGROUND OF THE INVENTION

1. Field of the Invention

The present invention generally relates to digital data processing systems and more particularly relates to such systems which utilize data base recovery techniques.

2. Description of the Prior Art

A key design element of high reliability computer systems is that of failure detection and data base recovery. Modern failure detection schemes may detect both hardware and software faults. For hardware faults, it has long been recognized that the integrity of the data bits within the computer system is critical to ensure the accuracy of operations performed in the data processing system. The alteration of a single data bit in a data word can dramatically affect arithmetic calculations or can change the meaning of a data word as interpreted by other sub-systems within the computer system. Often the cause of an altered data bit can be traced to a faulty hardware element within the computer system and therefore it is critical that failure detection be performed thereon.

Software faults, on the other hand, may occur because of inadvertent software "bugs", conflicts between unrelated software programs, or insufficient hardware to support the number of programs that are in operation. For example, the operation of multiple programs on one or more computer systems may cause data coherency problems. That is, a first user program may alter the data at an address location that is used by a second user program, without the second user program knowledge. Another example of a software fault may be when an address pointer inadvertently extends beyond a predefined address range, or when a system runs out of memory. High reliability computer systems may also detect these type of software faults.

After a fault has been detected, the integrity of the data base may be compromised. One approach to solving this problem may be to reboot the computer after the failure has been fixed, and then to restart the user programs. While this method may be adequate for personal computers, it may not be acceptable for high reliability computer applications where the data base cannot be discarded upon the detection of a failure. Examples of high reliability computer applications include airline reservation applications, banking transaction applications, etc. It is readily apparent that for these applications, the integrity of the data base is of utmost importance. Furthermore, it is important to remove any unwanted changes that may have been made to the data base as a result of the fault.

As indicated above, it is now common in large scale data processing systems to permit software developers to execute a number of user programs simultaneously therein. It is further common in large scale data processing systems to permit a user program operating in a local computer system to access a data base in a remote computer system. This is especially true for a number of high reliability computing applications. For example, in the airline reservation example discussed above, a local computer having a first portion of an airline reservation data base may be operating a user program wherein the user program may access a second portion of the airline reservation data base which may be located on a remote system. The local user program may need access to the remote data base to determine seat vacancies, make seat reservations, or the like.

Such systems generally coordinate the operation of the number of user programs, or the access of the local user program to the remote data base, by assigning each user program a dedicated address space within a corresponding data base. Various other address spaces may be provided within each data base for storing global variables, scratch pads values, etc., which may be accessed by selected user programs. This last feature may allow user programs to share predefined information, such as global variables or global sub-routines.

It is common to have an executive program coordinate the number of user programs such that data coherency problems are avoided. In a typical system, each user program may make a request to an executive program wherein the executive program may assign a dedicated address space within the data base to the requesting user program. That is, a first user program may be assigned a first dedicated address space within the database, while a second user program may be assigned a second dedicated address space. Similarly, an executive of a remote computer system may assign a dedicated address space within a remote data base to a local requesting user program.

To assist in the data base management of a computer system, it is common for user programs to be written using a virtual addressing scheme. Virtual addressing is a technique wherein all memory accesses by a specific user program are relative in nature. The major advantage of this approach is that memory management can be efficiently performed by the system at the time of program execution depending upon resource availability and requests from other users. Further, the memory management process appears transparent to the user. The 2200/600 system, available from the assignee of the present invention and described in U.S. Pat. No. 5,379,392, is an example of such a system.

A virtual address may comprise a base address, an index, and an offset. To compute the absolute address from the virtual address, the base address may be provided to a base register wherein a base value may be provided. The index may be provided to an index table wherein an index value may be provided. By summing the base value, the index value, and the offset, the corresponding absolute address may be obtained. The executive program may provide separate base registers and index tables for each user program to help ensure that the number of user programs operating in a corresponding computer system may remain within separate address domains within the data base.

For systems having the general architecture described above, a problem may arise when a fault is detected with a corresponding computer system. The fault may be a permanent hardware fault, a transitory hardware fault, or a software fault. The fault may cause various instructions to provide inaccurate data, and the inaccurate data may be written into a corresponding data base. Furthermore, a fault may cause a first user program to write data into a second user program's address space. With a number of user programs being executed simultaneously, it is readily apparent that error detection and data base recovery are becoming increasingly important.

Data base recovery techniques have been developed to overcome some of the limitations discussed above. In one such technique, the data base may be reconstructed after the detection of a fault. That is, when a fault is detected, it may not be necessary to restart all of the user programs currently running on the computer system and thus loose the progress achieved by the user programs before the failure occurred. Rather, the state of the computer system may be essentially reconstructed, and all of the transactions which were in progress during the fault may be either rolled back and re-executed after data base recovery, or rolled forward thereby allowing the next instruction to be executed after data base recovery. Further, the environment of the computer system may be reconstructed in a similar manner. Thus, after data base recovery, the user programs may begin execution where they left off. This may substantially increase the overall efficiency of a high reliability computer system.

With the advent of multi-processor computer systems, the complexity of failure detection and data base recovery has increased substantially. The term "multi-processor computer systems", as used herein, may include a local computer system which is coupled to a remote computer system. This may include networked computer systems via LAN's, etc. This may allow a user program operating on a local computer system to access various data bases throughout a corresponding multi-processor system. That is, each processor (or computer) may have an associated data base which is controlled thereby wherein a local user program may request access to a remote data base. This request may be called a global data base transaction step. The term "global" distinguishes a data base transaction from one which is entirely local to the user program. Each of the global transactions may have a related portion in the local data base. For example, the user program may calculate the contents of a particular local data base location based upon the contents of a remote data base location.

It may be difficult to perform error detection and data base recovery when a user program provides a global transaction to a remote system. That is, some transaction steps provided by a user program may include updates to data bases which reside on one or more remote systems. These steps generally cannot be recovered until it is determined what state the global transaction had reached before the fault occurred. The state of each transaction may be necessary to properly reconstruct the state of the local data base as it existed just prior to the fault. For example, the state of each transaction may be necessary to determine whether the transaction should be rolled back and re-executed after data base recovery, or rolled forward thereby allowing the next instruction to be executed after data base recovery.

A limitation of prior art systems is that the time delay associated with determining the state of each global transaction may be substantial. It is known that communication between remote systems can be time-consuming. This may be caused by a variety of factors including a slow communication link or a busy remote system. Further, some remote systems may not be immediately available to service the data base recovery routine. That is, a remote system may have a power failure or the like. Therefore, to recover all of the global transactions for a particular user program, the user program may have to wait a substantial amount of time before regaining control of the local data base.

SUMMARY OF THE INVENTION

The present invention overcomes many of the disadvantages of the prior art by providing a method for allowing a user program, which has provided a global transaction to a remote data base, to continue operation after only a partial recovery, thereby significantly reducing the delay associated with a detected fault or failure. That is, a first portion of a data base, which may correspond to local data base transactions, may be recovered and released very quickly. Thereafter, the corresponding global transactions may be recovered in due course, being limited by the communication link with the remote data base. In this configuration, the user program may again access to most of the data base, except the portion that corresponds to the global transactions, immediately after the local data base transactions have been recovered. Since recovery of the global transactions may be the most time consuming, the present invention may significantly reduce the delay between a detected fault and the time that a user program may gain access to the affected data base.

In an exemplary embodiment, the state of all local transactions may be maintained in an audit trail file by an executive program, thus allowing the local transactions to be recovered by the local system. The executive may also maintain the state of all global transactions by indicating a "ready" state if a remote system had already started processing a corresponding global transaction step. For all global transaction steps in a "ready" state, a data base management system may re-establish the local data base locks and system environment variables associated therewith. Thereafter, the user programs may continue operation and may access the un-locked portion of the data base. In the meantime, a transaction manager may determine the actual state of the global transactions by performing the necessary communications with the remote system(s). Once the actual state of a particular global transaction is determined by the transaction manager, the global transaction may be either rolled forward or rolled back, as discussed above, and the corresponding data base locks may be released. As the transaction manager determines the actual state of the remaining global transactions, more of the data base may be released to the user programs. Eventually, the entire data base may be available to the user programs.

In an exemplary embodiment, various user programs may access one or more data bases within a computer system through a number of "application groups". An application group is a logical partition of the exemplary computer system wherein each of the application groups can be independently recovered following a system fault. The exemplary system may be partitioned into up to sixteen (16) different application groups.

Each user program may be mapped to at most one application group. The mapping of the various user programs to the number of application groups may be controlled by an intercept and connect routine. When a user program makes a request for access to a system data base, the intercept and connect routine may determine which application group should be assigned thereto by consulting an application definition table. The application definition table may contain predetermined information about each application group including, but not limited to, the current status of the application group, the memory locations assigned thereto, etc. In this configuration, one application group may be configured to support a large user program having large memory requirements, while another application group may be configured to support a small user program. In this way, user program requirements may be matched to a suitable application group thereby minimizing the amount of wasted system resources. After the intercept and connect routine makes the application group assignment, the user program may access the application group data base via the assigned application group for the duration of the user program's execution, where the application groups have logically partitioned application group data bases.

During normal operation, an executive program may record the status of each data base transaction in an audit trail file. For local transaction steps, the status may include an "active" state, a "commit in progress" state, and an "end of step" state. When a fault is detected in a corresponding application group, the recorded status may be used to determine the fate of an incomplete transaction step. For example, if the fault occurred when a corresponding transaction step was in the "active" state, indicating that the transaction step was currently being processed, the transaction step may be rolled back so that the data base may look as if the step had never been processed. This may be accomplished by consulting the audit trail file and by reversing any intermediate changes made thereby. If the fault occurred when a transaction step was in the "commit in progress" state, indicating that the transaction step had reached a point where the updates had been saved, the corresponding step may be rolled forward so that the data base may look as if the step was completed successfully. Finally, if the fault occurred when a transaction step was in an "end of step" state, indicating the transaction step had been completed, no action may be required. Every transaction step that was in progress at the time of the fault must be addressed in this manner before any further transactions may access the data base via a corresponding application group. This may be necessary to maintain data coherency, and may allow the user program to be restarted at a point which corresponds to just prior to the detection of the fault.

In the exemplary embodiment, some of the transaction steps may be global transaction steps. That is, some of the transaction steps may include updates to various remote data bases. As discussed above, these steps cannot be recovered until the actual state thereof can be determined. That is, each of the global transactions may have a related portion in the local data base. For example, the user program may calculate the contents of a particular local data base location based upon the contents of a remote data base location. However, in the exemplary embodiment, the executive program may maintain a record of whether each global transaction is in a "ready" state, indicating that the corresponding remote system had begun processing the particular global transaction step, at the time the fault occurred.

A global transaction step that was interrupted in the "ready" state may not be handled immediately because communication with a remote system is required to determine how to proceed. Instead, a data base management system may re-establish the data base locks and system environment variables associated therewith. Thereafter, the user programs may continue operation and may access the un-locked portion of the data base. That is, the user programs may be allowed to access a corresponding application group after only a partial data base recovery. In the meantime, a transaction manager may determine the actual state of the global transactions by performing the necessary communications with the remote systems. That is, the transaction manager may determine whether a corresponding global transaction step was in an "active" state, a "commit in progress" state, or an "end of step" state. Once the actual state of a particular global transaction step is determined, the global transaction step may be either rolled forward or back, as discussed above, and the corresponding data base locks may be released. As the transaction manager determines the actual state of the global transactions, more of the data base may be released to the user programs. Eventually, the entire data base may be available to the user programs.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
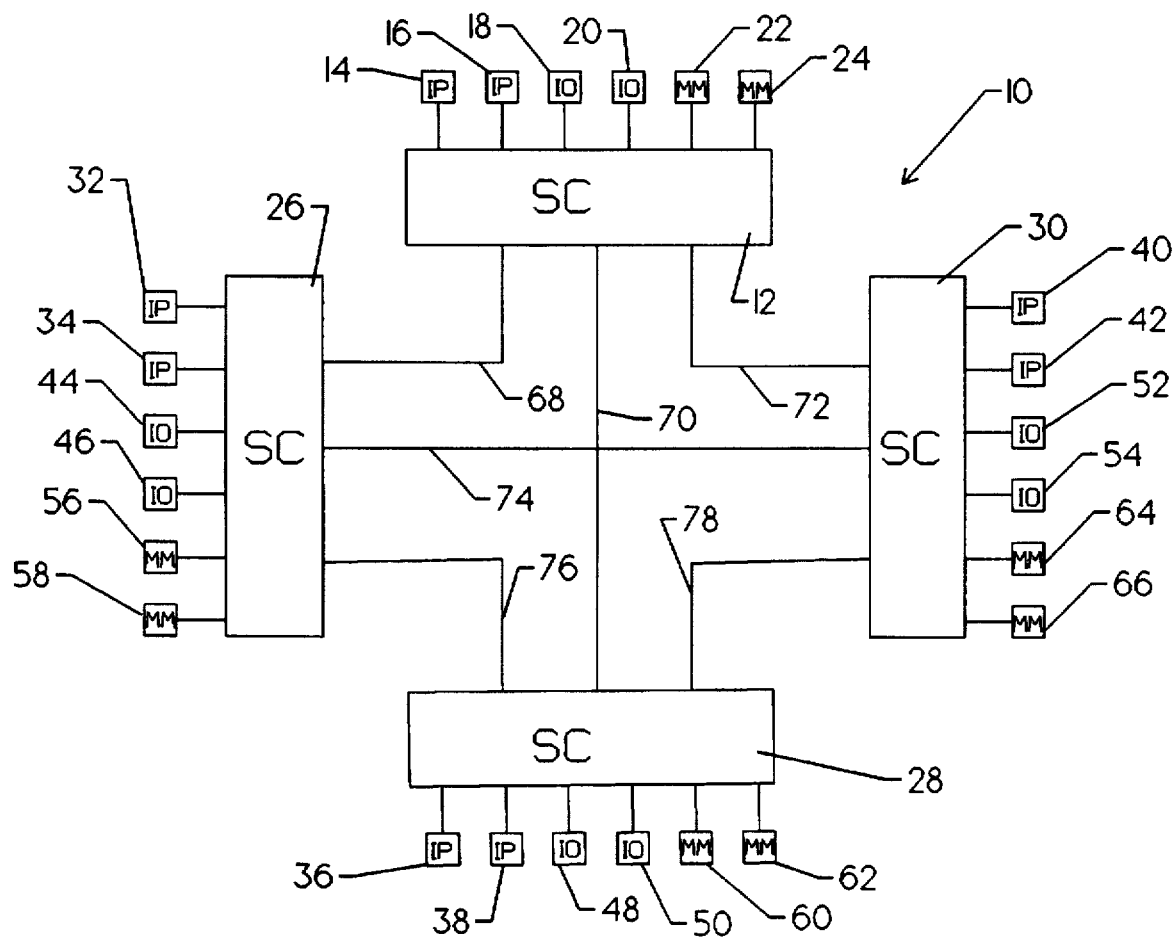
FIG. 1 is a schematic diagram of the preferred data processing system in which the present invention may be utilized.

FIG. 1 is a schematic diagram of the preferred data processing system 10 in which the present invention may be utilized. It is recognized that the present invention may be utilized in any computer system which may access a local data base and a remote data base. The local and remote data bases may be within a single multi-data base computer system, or the local data base may be part of a local computer system and the remote data base may be part of a remote computer system.

In the exemplary embodiment, data processing system 10 may include four individual processing clusters, each having its own storage controller and each having point-to-point communication with the other clusters via a storage controller to storage controller interface.

Storage controller 12 is coupled to storage controller 26 via interface 68. Similarly, storage controller 12 is coupled to storage controller 28 via interface 70 and to storage controller 30 via interface 72. Storage controller 26 communicates with storage controller 28 via interface 76 and to storage controller 30 via interface 74. In similar fashion, storage controller 28 and storage controller 30 are coupled via interface 78.

Storage controller 12 is fully populated with instruction processor 14, instruction processor 16, input/output processor 18, input/output processor 20, main memory module 22 and main memory module 24. Each of instruction processors 14 and 16 (along with similar instruction processors 32, 34, 36, 38, 40, and 42) has internal dedicated cache resources in the form of an instruction cache and an operand cache. These elements, along with the associated data invalidity logic, are described in more detail below. A more general description of the construction and operation of instruction processors 14 and 16 may be found in U.S. patent application Ser. No. 07/762,282, which has been incorporated by reference.

Input/output processors 18 and 20, along with main memory modules 22 and 24, may be elements currently available, such as found in the Unisys Model 2200/600 series. Input/output processors 44, 46, 48, 50, 52, and 54 and main memory modules 56, 58, 60, 62, 64, and 66 may be similarly found.

Storage controllers 12, 26, 28, and 30 may each control a separate data base. For example, storage controller 12 may store a first data base in memory modules 22 and 24. Similarly, storage controller 26 may store a second data base in memory modules 56 and 58. As is described in more detail below, instruction processors 14 and 16 may access any of the data bases stored in memory modules 22, 24, 56, 58, 60, 62, 64, and 66, via interfaces 68, 70, 72, 74, 76, and 78.

A more detailed discussion of the above described system may be found in U.S. patent application Ser. No. 07/809,386, entitled "Method and Apparatus for Rapidly Loading Addressing Registers", which has been incorporated herein by reference.

Figure 2:
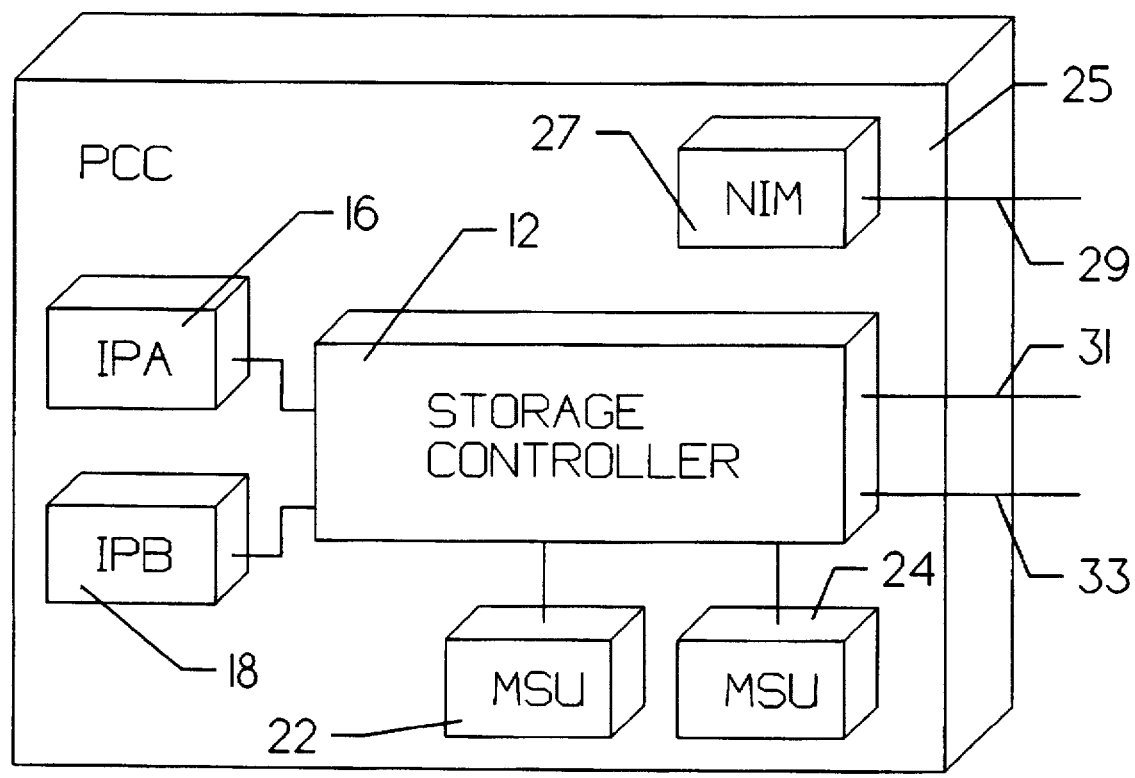
FIG. 2 is a pictorial diagram showing the packaging arrangement of the data processing system of FIG. 1.

FIG. 2 is a schematic diagram showing the packaging of a portion of data processing system 10. A major physical element of data processing system 10 is processing Complex Cabinet, PCC 25. Within fully populated PCC 25 is located instruction processors 16 and 18 (i.e. IPA and IPB). In the preferred mode, each of these instruction processors is packaged on a single high density circuit board. The memory storage units 22 and 24 are coupled to storage controller 12 as explained above.

Network interface module (i.e. NIM) 27 provides an interface to the operator console via cable 29. Cables 31 and 33 couple input/output units 18 and 20 (see also FIG. 1) to storage controller 12. Input/output units 18 and 20 are physically packaged in an input/output Complex Cabinet (i.e. ICC) which is not shown for clarity. Other referenced elements are as previously described.

Figure 3:
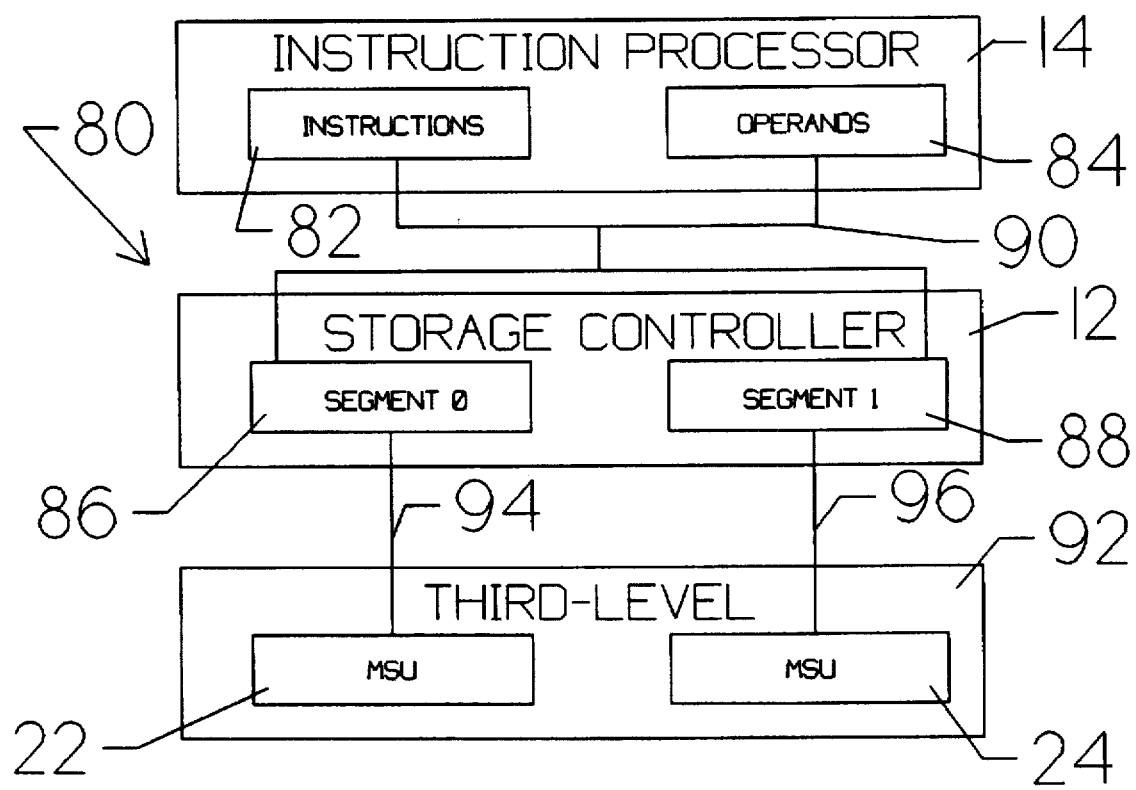
FIG. 3 is a schematic diagram of the levels of storage for a single instruction processor.

FIG. 3 is a flow diagram 80 showing the hierarchical arrangement of the three levels of storage within data processing system 10. Instruction processor 14 contains an instruction cache 82 and an operand cache 84, each storing 8 k of 36 bit words. These are internal to instruction processor 14 and dedicated to the operations undertaken therein. By partitioning the internal dedicated cache resources in this manner, there is a certain concurrence of cache accesses associated with normal instruction execution.

Upon the request of instruction processor 14 to access a particular data element as either an instruction or operand, the directory of instruction cache 82 or operand cache 84, respectively, is queried to determine if the required data element is present within the associated cache resource. If the data element is present and valid, the access is completed at that level. If not, access is made to storage controller 12 via interface 90 for the block of eight 36 bit words containing the desired data element. A more detailed explanation of the operation of instruction cache 82 and operand cache 84 is found below.

Storage controller 12 contains an intermediate level cache segment of 128 k 36 bit words for each for each main memory module within the cluster. In the present illustration, storage controller 12 contains segment 0 cache 86 and segment 1 cache 88. These cache resources are shared by all users of the main memory within the cluster to include both local and remote users. Any memory request to storage controller 12 is routed to the appropriate directory of segment 0 cache 86 or segment 1 cache 88 to determine if the desired data element is present and valid. This routing is based upon the address requested, since the intermediate cache resources are partitioned in address space to correspond to the associated main memory module.

If present and valid, the requested data element is supplied as an eight word block. If the requested data element is not validly present in segment 0 cache 86 or segment 1 cache 88 (depending upon the requested address), the data is requested from third level storage 92 containing main memory modules 22 and 24 via interfaces 94 and 96, respectively. In the preferred mode, main memory modules 22 and 24 each contain 64 meg. words of storage.

Each data element request to storage controller 12 is made through a separate interface. For a fully populated system, this includes two instruction processors, two input/output processors, and three other storage controllers (see also FIG. 1). Each data element request is divided between segment 0 cache 86 and segment 1 cache 88 based upon the requested address. Only if the requested data element is not validly present in the appropriate intermediate level cache resource is an access request made to third level 92.

Figure 4:
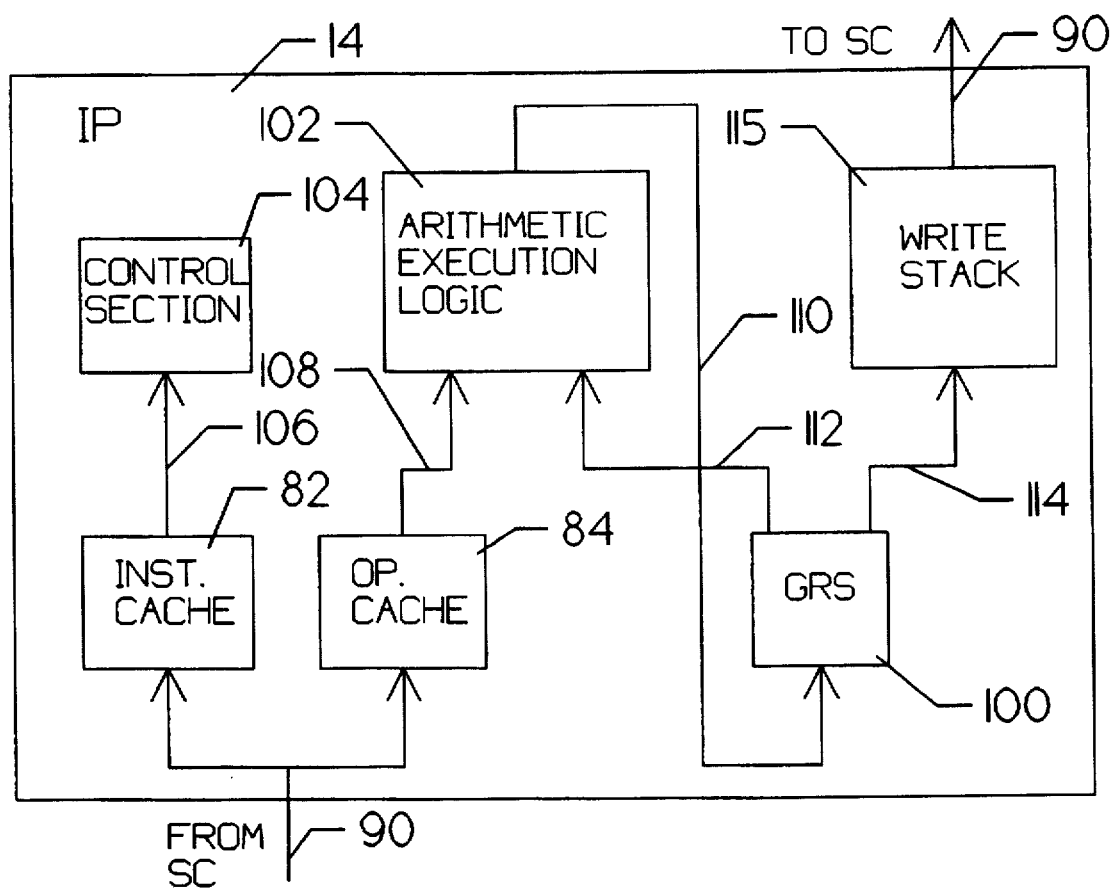
FIG. 4 is a simplified block diagram showing the major elements of the instruction processor.

FIG. 4 is a simplified block diagram of instruction processor 14 showing the major data and control paths. Cable 90, providing the data transfer path between storage controller 12 and instruction processor 14, is actually a two-way path. Data is accessed by storage controller 12 and routed to either instruction cache 82 or operand cache 84 depending upon whether the initial request was for instruction data or operand data. In accordance with usual local cache operation, instruction cache 82 and operand cache 84 temporarily store the data for use by instruction processor 14. Cable 90 also couples write data from write stack 115 to storage controller 12 for longer term storage. Priority for this shared interface is ordinarily given to read data requests requiring write data to be queued in write stack 115. The exception to giving priority to read data is whenever data is to be read from a location for which a write access has been queued.

Instructions from instruction cache 82 are provided via path 106 to control section 104 for decoding via microcode controller and hardwired control logic. This is discussed in greater depth below. Arithmetic execution logic 102 receives operand data via path 108 and performs the specified operation using a combination of microcode controller and hardwired control as explained in greater detail below.

Most arithmetic instructions operate upon data which is temporarily stored in general register stack 100. This permits most rapid access to the data, because that data is directly accessed from an extremely fast storage stack. Similarly, arithmetic results are often returned to general register stack 100 for temporary storage until further arithmetic processing. Data is routed to general register stack 100 by path 110. Data from general register stack 100 is routed back to arithmetic execution logic 102 via path 112 and to write stack 115 via path 114. The data transferred to write stack 115 is queued for storage by storage controller 12 as discussed above.

Figure 5:
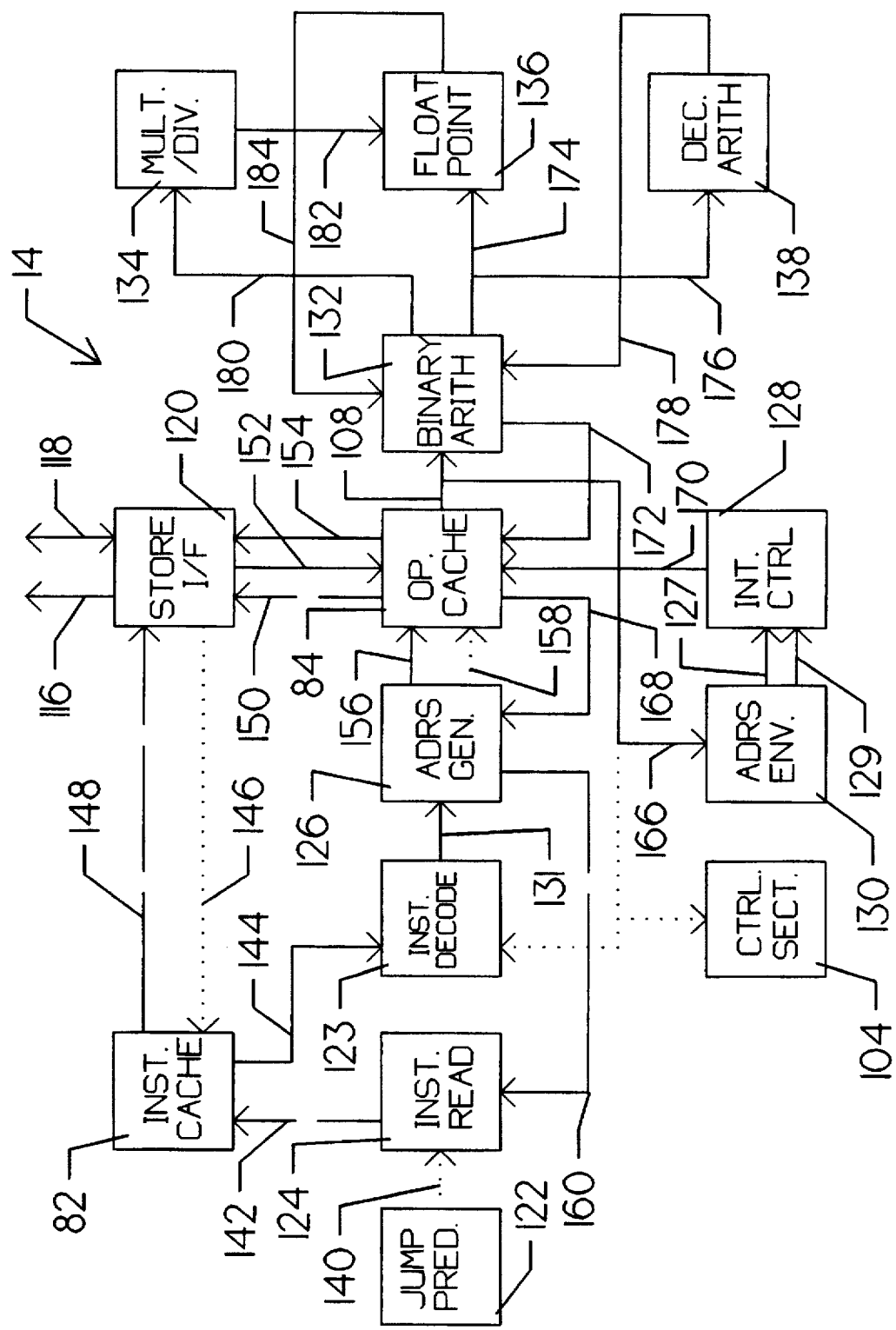
FIG. 5 is a detailed block diagram of the instruction processor.

FIG. 5 is a more detailed block diagram of instruction processor 14. The major data paths are shown, with the solid line paths signifying 72 bit, double word, transfer paths; the dashed line paths signifying addressing paths; and the dotted lines indicating data paths of no greater the 36 bits. Control line paths are not shown for clarity.

The interface to storage controller 12 is via cable 90, as described above. It consists of write cable 116 and read/write cable 118. Each of these data paths couples a 72 bit double word in parallel fashion. The function of write stack 115 (see also FIG. 4) is incorporated within store interface 120 which also provides the request/acknowledge synchronization logic. Addressing information for store interface 120 is sent from instruction cache 82 via cable 148 and operand cache 84 via cable 150 for a corresponding cache miss. Instructions are sent to instruction cache 82 via path 146. Because instructions are 36 bit words, path 146 has a width of 36 bits. Operand data read by storage controller 12 is transferred from store interface 120 to operand cache 84 by path 152. Similarly, write operand data is sent from operand cache 84 to store interface 120 via path 154. Both path 152 and path 154 have a width of 72 bits to accommodate double word operands.

Instructions to be executed are addressed by instruction read 124. The addresses are computed using one of the base registers located within address environment 130 as explained in more detail below. If the instruction is the next sequential instruction, its address is determined by incrementing the program address counter. If the instruction to be executed is addressed by a branch or jump instruction, the address is computed by address generator 126 and supplied via path 160. Alternatively, the address is supplied by jump prediction 122 via path 140 during operation in the jump prediction mode. The address of the next instruction is provided to instruction cache 82 via path 142.

The next addressed instruction is fetched from instruction cache 82 if a match is found. If the request results in a cache miss, storage controller 12 is requested to read the memory block containing the instruction as discussed above. In either case, the instruction is provided to instruction decoder 123 via path 144. The instruction is decoded through the use of a microcode controller by instruction decode 123, and the operand address is computed by address generator 126 from the data received via path 131.

Operand cache 84 contains general register stack 100 (see also FIG. 4). The cache is addressed by the output of address generator 126 received from path 158. Direct operands are received on path 156. If a match is not made in operand cache 84, a read request is made of storage controller 12 through store interface 120 as explained above. If a match is found in operand cache 84 or if the instruction specifies a direct operand received on path 156, the operand data is more immediately produced. In either case, the operand data is routed in accordance with the operation to be performed as specified by the instruction. Indirect operands cause the new operand address to be transferred to address generator 126 via path 168. Operands are transferred to binary arithmetic 132 for mathematical computation via path 108 or to address environment 130 via path 166.

Binary arithmetic 132 provides the basic control for all arithmetic operations to be performed on data received via path 108. Floating point operations are scaled and controlled by floating point logic 136 which receives operand data on path 174. Floating point results are returned to binary arithmetic 132 by path 184. Mult./div. 134 performs the basic multiplication and division operations for fixed point instructions. Operand data is received via path 180 and the products/quotients returned via path 182 and floating point logic 136. Decimal arithmetic 138 receives operand data on path 176 and returns results via path 178. Decimal arithmetic performs special purpose decimal operations.

Another category of instructions involves a change to the base registers within addressing environment 130. The data is supplied to addressing environment 130 via path 166. Base register contents are supplied to interrupt control 128 via paths 127 and 129. Interrupt control 128 provides the interrupt data to operand cache 84 via path 170. Control section 104 provides the overall microcode control.

The operation of instruction processor 14 is intended to occur in the pipelined mode whenever feasible. A more detailed description of the timing of this pipelined operation may be found in U.S. patent application Ser. No. 07/762,282, entitled "Cooperative Hardware and Microcode Control System for pipelined Instruction Execution", which has been incorporated herein by reference. The remaining referenced components are as previously discussed.

Figure 6:
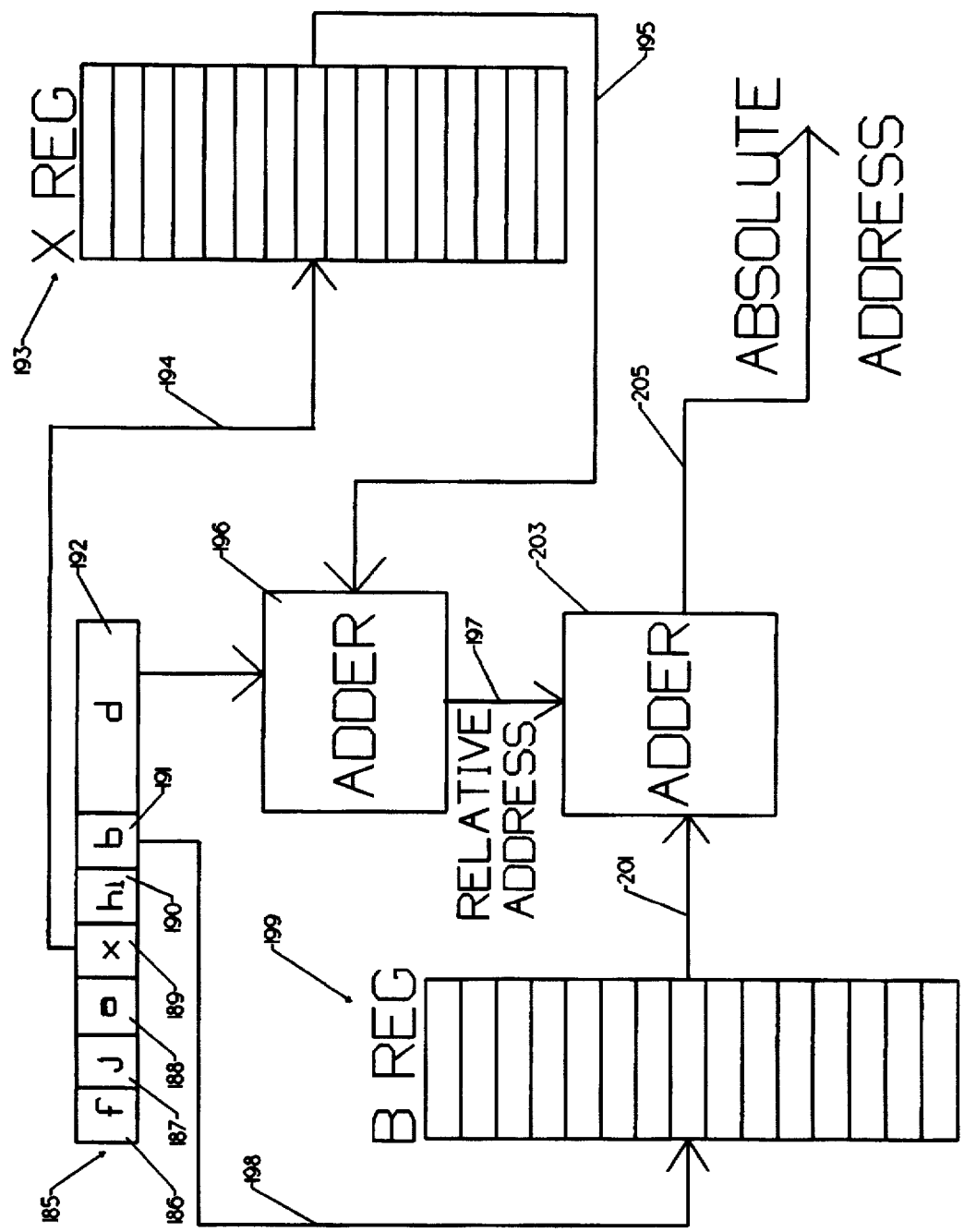
FIG. 6 shows the generation of an absolute operand address for an extended mode instruction.

FIG. 6 is a schematic diagram showing the formation of an absolute operand address. Instruction 185 is a 36 bit word containing an extended mode instruction. Function code 186 specifies the operation to be performed. J field 187 provides for interpretation of the operand. The use of a particular index register is designated by x field 189. Hi field 190 provides operand mode and indirect addressing options. B field 191 is a four bit field, which in the extended mode, identifies one of the 15 user base registers. An operand displacement is provided by d field 192. A more detailed explanation of the instruction format may be obtained from U.S. patent application Ser. No. 07/762,282, entitled "Cooperative Hardware and Microcode Control System for pipelined Instruction Execution", which has been incorporated herein by reference.

One of the 15 locations of base register stack 199 is selected by the contents of b field 191 supplied by cable 198. The format for the contents of base register stack 199 is explained in more detail below. The address read from the selected base register location is provided to adder 203 via cable 201 wherein it is added to the relative address received from adder 196 via cable 197. The output of adder 203 is an absolute address provided on cable 205.

The x field 189 is a four bit quantity used to select one of the 16 index registers of index register stack 193 via cable 194. The contents of the selected index register is an address index which is supplied to adder 196 via cable 195. Adder 196 adds the address index to the displacement received from d field 192. The sum is a relative address which is provided to adder 196 via cable 197.

Figure 7:
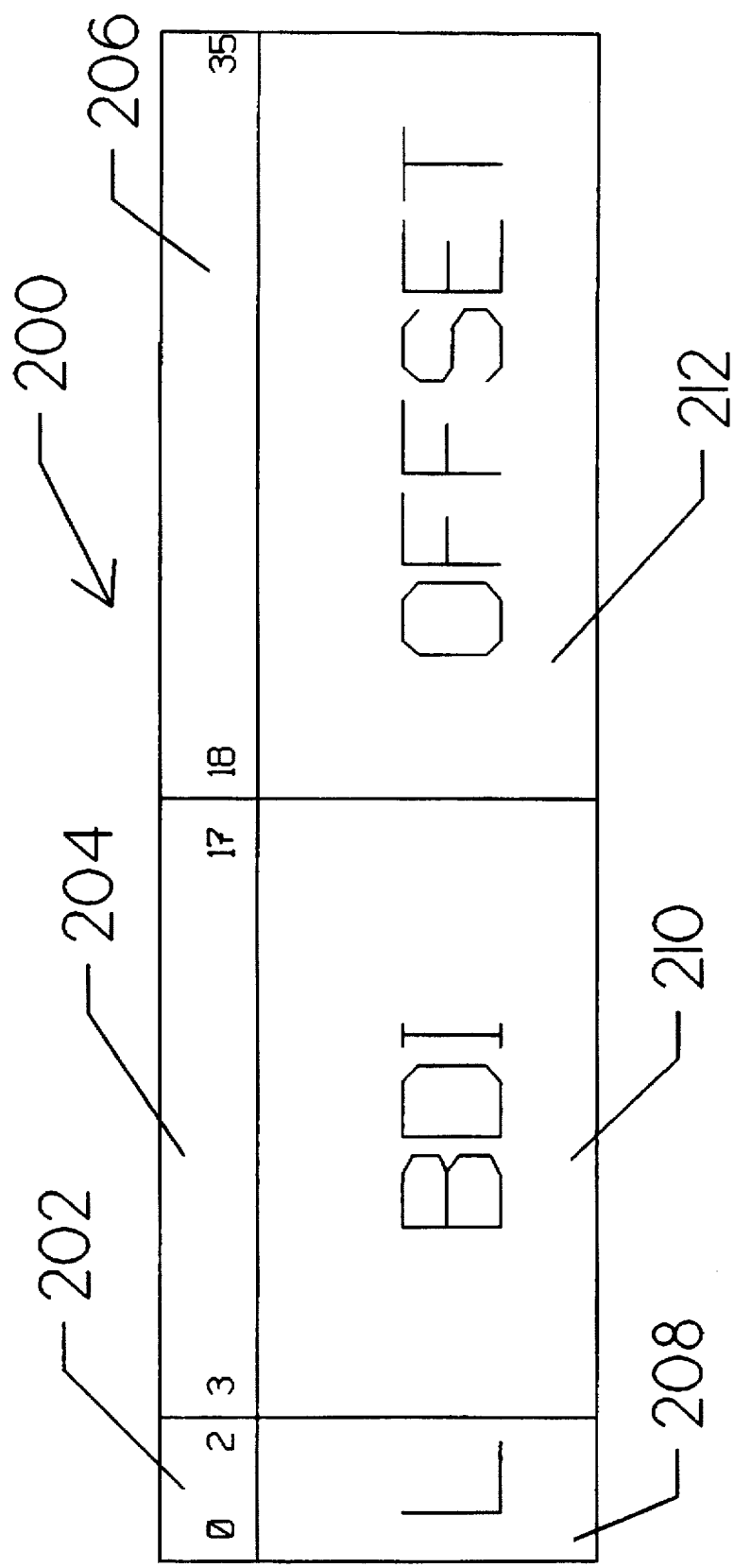
FIG. 7 shows the format of a virtual address.

FIG. 7 shows the format 200 of a virtual address. As explained above, the virtual address is used by an application program to specify the location of a data segment. To permit execution of the user program, this virtual address must be converted through paging to an absolute address for reference to a physical storage location. However, great flexibility is provided by permitting the user program to define the data segment using this virtual address.

The virtual address format 200 has a width of 36 bits which are divided into three separate fields. Field 202, consisting of the three least significant bit positions 0–2, contains variable 208, designated "L". This variable is a control character which selects one of the eight bank descriptor tables.

Bit positions 3–17 are partitioned as field 204. This 15 bit field is used to store variable "BDI", the Bank Descriptor Index 210. The BDI provides an index into the bank descriptor table selected by L variable 208. This index uniquely defines one of the bank descriptors within the table. An absolute address is computed using the contents of the uniquely identified entry in the bank descriptor table.

The most significant half of the base register entry (i.e. bit positions 18–35) define field 206 which is used to store offset 212. This variable is added to the base address contents of the uniquely identified entry within the bank descriptor table to produce the address to be loaded into the base register being referenced.

Figure 8:
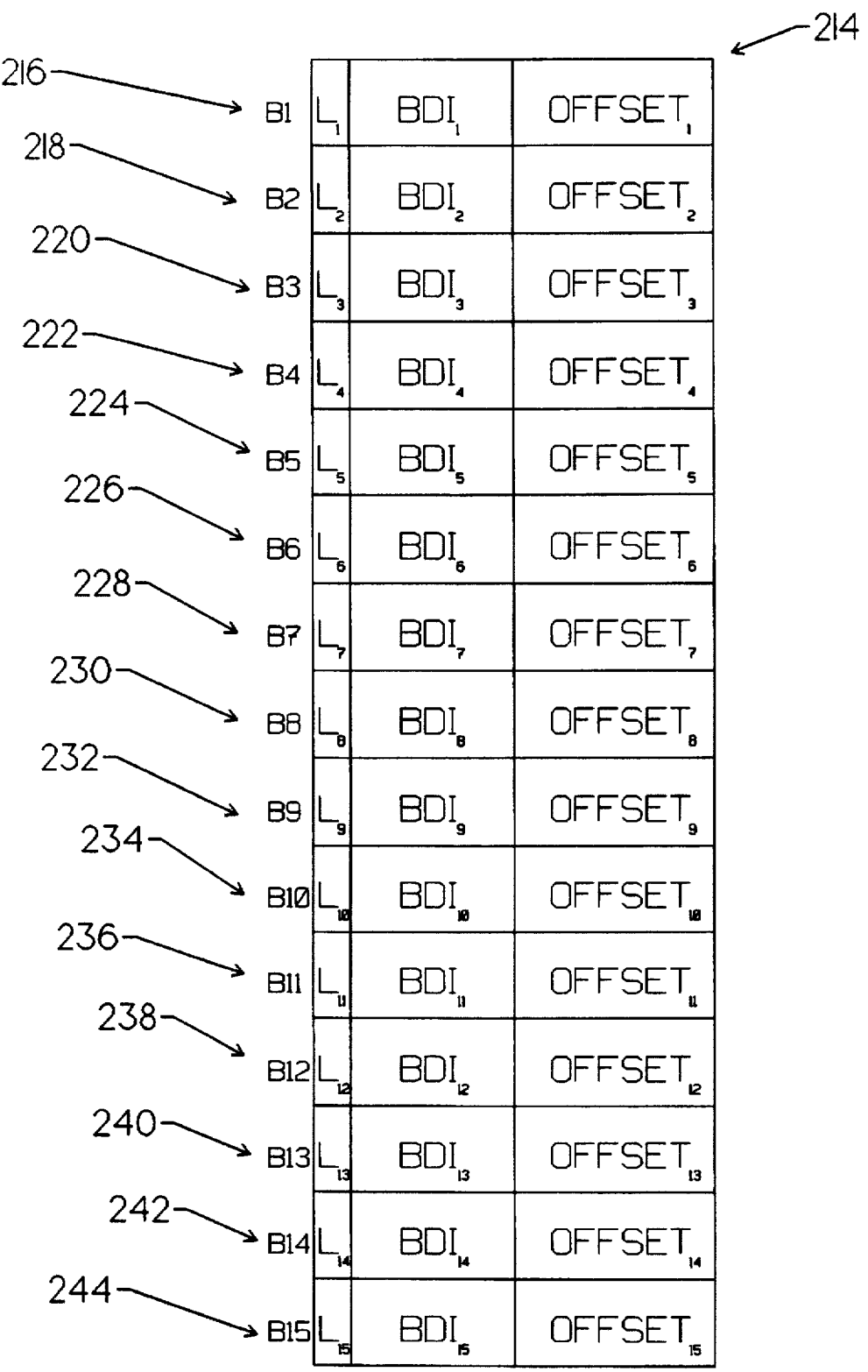
FIG. 8 shows the format of the active base table.

FIG. 8 shows active base table 214 comprising the entire set of 15 virtual addresses which define the contents of the user base registers. This set of virtual addresses corresponds to base registers B1, B2, . . . , and B15. Loaded into the active base table are entries 216, 218, . . . , and 244, respectively. Each of these entries is as defined in FIG. 7.

Figure 9:
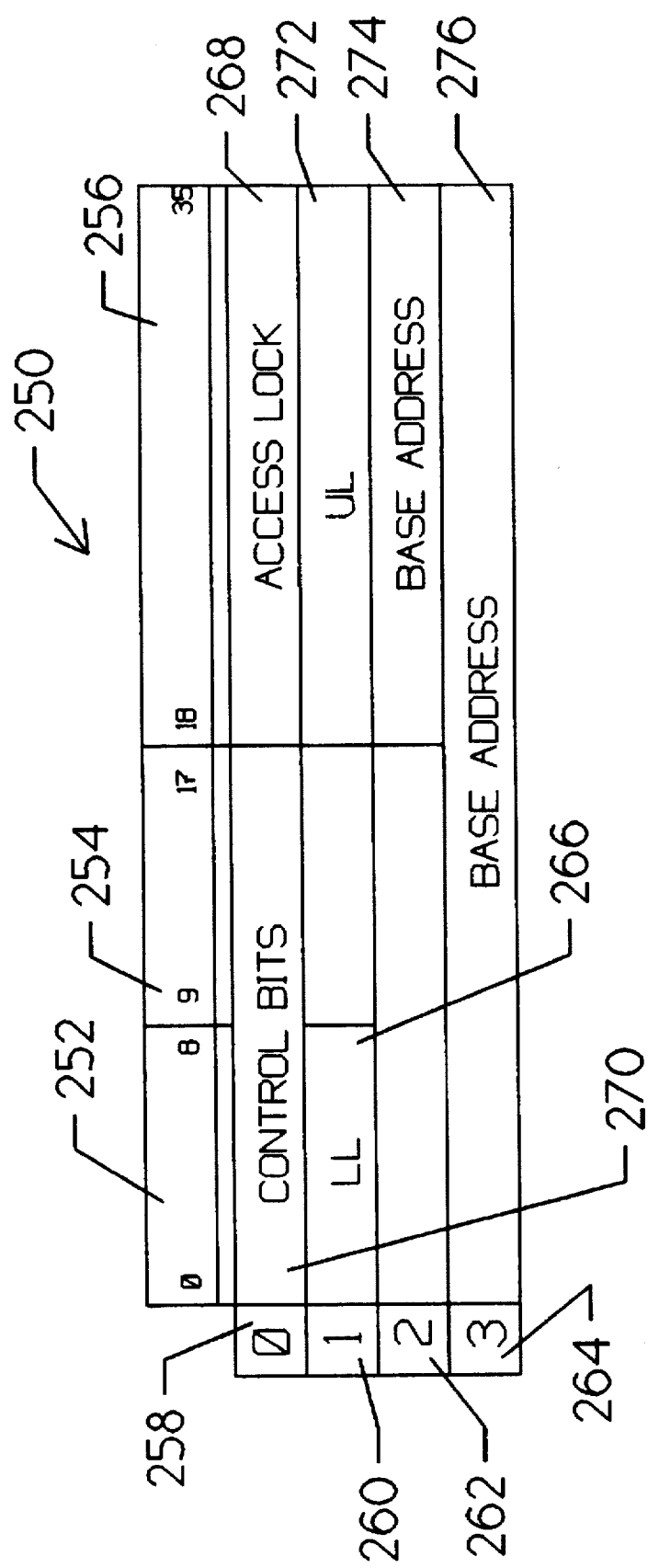
FIG. 9 shows the format of a base register entry.

FIG. 9 shows the format for one entry 250 in one of the 15 user base registers. Each entry consists of four 36 bit words (i.e. words 258, 260, 262, and 264), wherein each word has lower quarter 252, second quarter 254, and upper half 256. Word 258 has a number of control bits 270 within lower quarter 252 and second quarter 254. Upper half 256 of word 258 contains access lock 268. The access locks 268 may be used to effectively lock up a portion of the address space (or data base) thereby not allowing a user program to gain access thereto.

Lower limit 266 is located in lower quarter 252 of word 260. Upper limit 272 is located in upper half 256 of word 260. Upper limit 272 and lower limit 266 are used to set the security limits on user program access to the associated data segment.

The base address consists of portion 274 located in upper half 256 of word 262 and portion 276 located in the entire 36 bits of word 264. In this manner, an absolute storage space of $2^{52}$ words of 36 bits each can be uniquely addressed by the absolute address.

Figure 10:
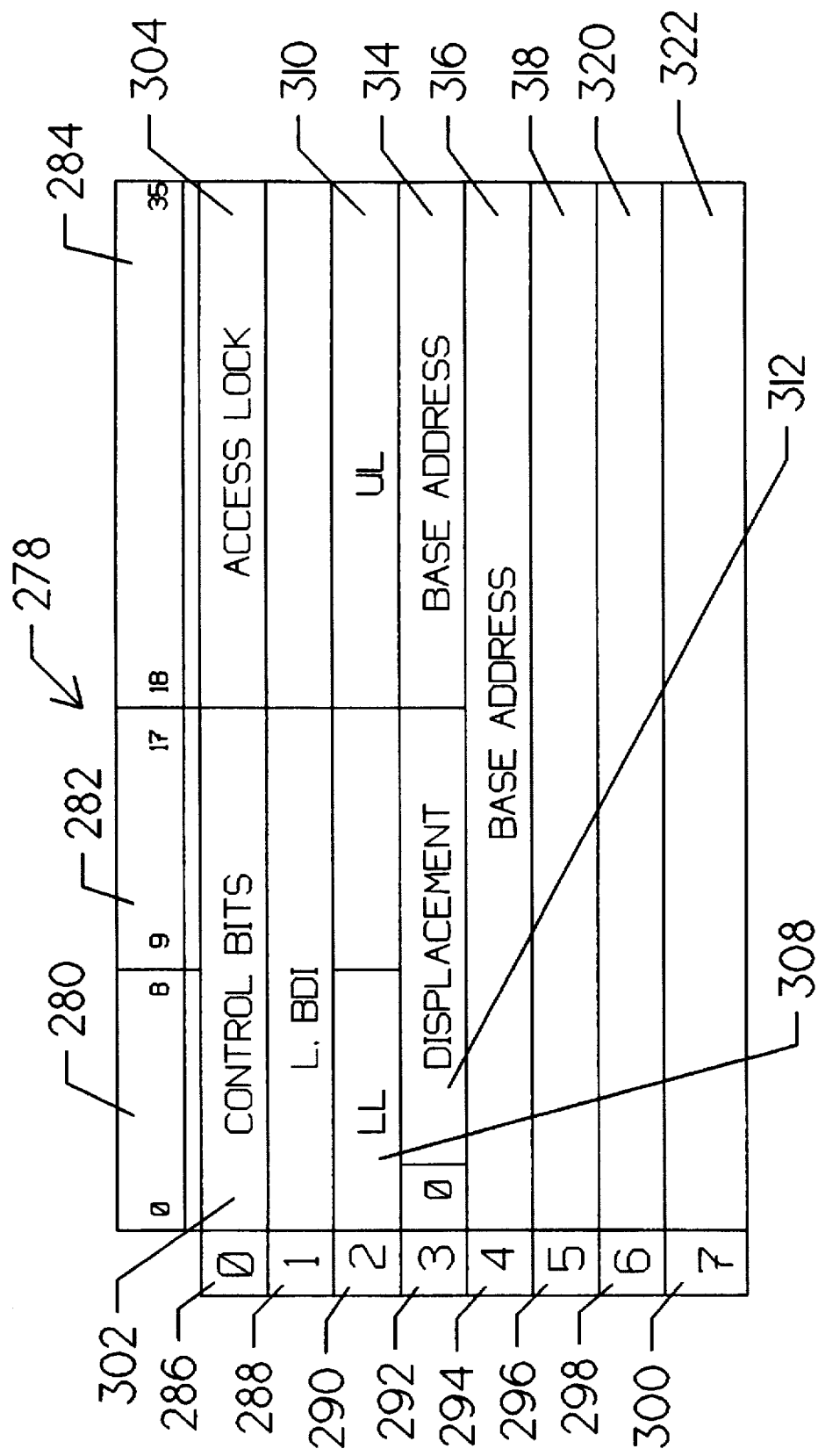
FIG. 10 shows the format of a bank descriptor table entry.

FIG. 10 shows the format 278 for an entry in one of the eight bank descriptor tables. Each bank descriptor table may accommodate up to $2^{15}$ entries (i.e. the maximum number which can be uniquely specified by BDI field 210 of virtual address format 220, see also FIG. 7). A single entry consists of eight 36 bit words (i.e. words 286, 288, 290, 292, 294, 296, 298, and 300). Each word consists of lower quarter 280, second quarter 282, and upper half 284.

Control bits 302 are contained in lower quarter 280 and second quarter 282 of word 286. Access lock 304 is located within upper half 284 of word 286 and may be used in a similar manner as described above with reference to FIG. 9. The L and BDI fields of the virtual address which identifies the entry are located in lower quarter 280 and second quarter 282 of word 288.

The 52 bit absolute address to be added to the offset of the virtual address consists of portion 314 located within upper half 284 of word 292 and portion 316 which occupies all of word 294. Lower limit 308 and upper limit 310 are located within word 290 as shown. Displacement 312 is located within word 292. User program variables 318,320, and 322 are stored within words 296, 298, and 300, respectively.

Figure 11:
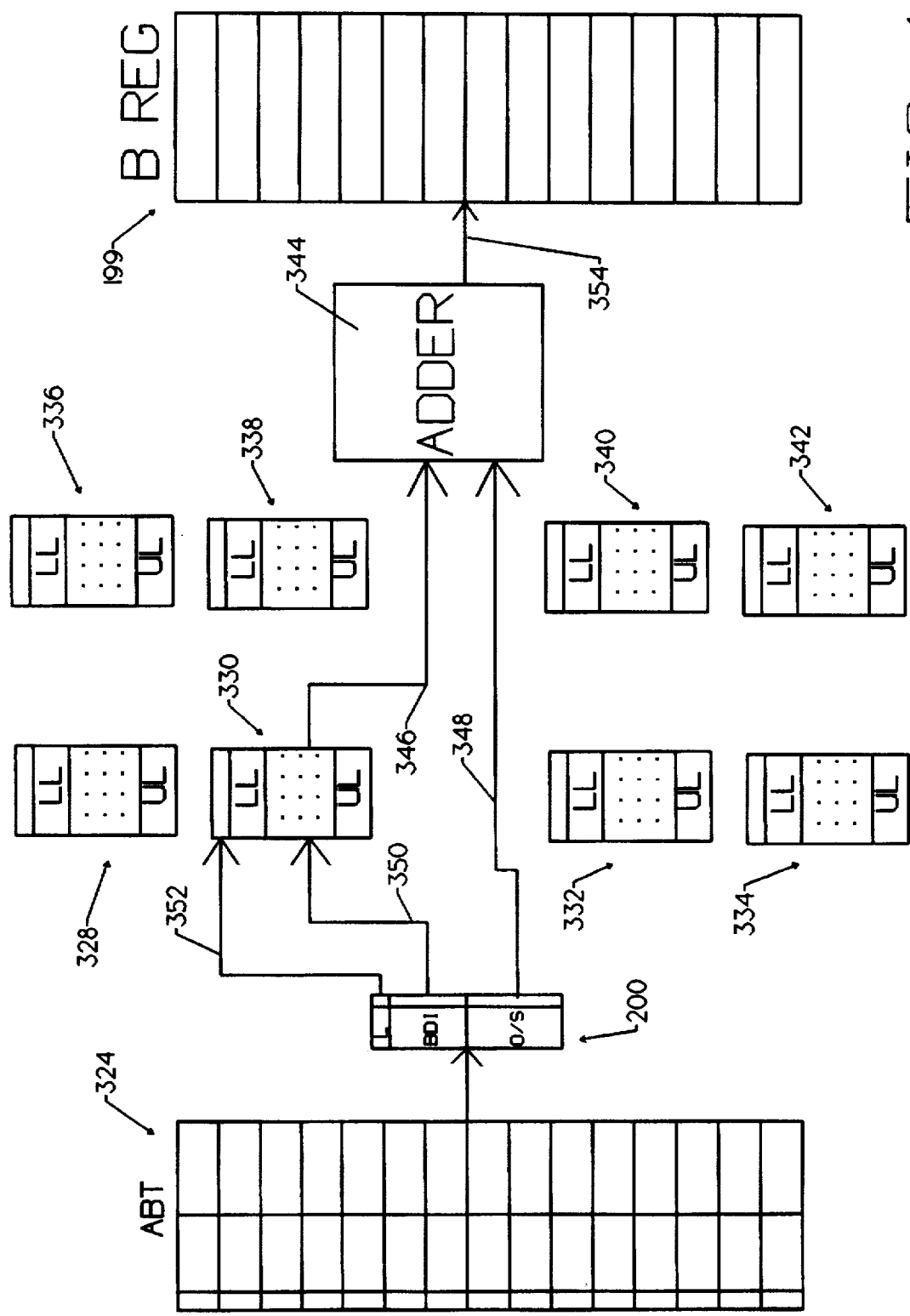
FIG. 11 shows the conversion of a virtual address into an absolute address for loading a base register.

FIG. 11 is a schematic diagram for the general process of loading a base register using a virtual address. To load a base register, a virtual address (see also FIG. 7) is loaded into the corresponding location of active base table 324 (see also FIG. 8). The L field is supplied from virtual address 200 via cable 352 to select one of the eight bank descriptor tables (i.e. bank descriptor tables 328, 330, 332, 334, 336, 338, 340, and 342). In the present example, bank descriptor table 330 is selected.

Of the $2^{15}$ entries (see also FIG. 10) within bank descriptor table 330, one is selected using the bank descriptor index field (i.e. BDI 210) of virtual address 200 transferred via cable 350. As explained above, the selected bank descriptor table entry contains lower limits, upper limits and a 52 bit address (see also FIG. 10). The 52 bit address is transferred to adder 344 via cable 346. Offset field 212 of virtual address 200 is transferred to adder 344 via cable 348. The 52 bit sum computed by adder 344 is loaded via cable 354 into the selected base register of base register stack 199.

Note that the selection and access of one of the bank descriptor table entries must be made, in general, if the previous content of the base register was determined with either a different bank descriptor table or a different entry within that bank descriptor table. However, when changing a base register entry, if the same base descriptor table and same entry within that table are used, the previous contents and future contents of the base register will differ only by the difference in the previous and present offsets. Therefore, such a base register change can be accomplished without any need to access the bank descriptor tables. In that case, the appropriate base register can be modified using the difference of the offsets. It has been shown in benchmark analyses that up to 85% of the user base register changes made during the execution of the user program change only the offset.

Figure 12:
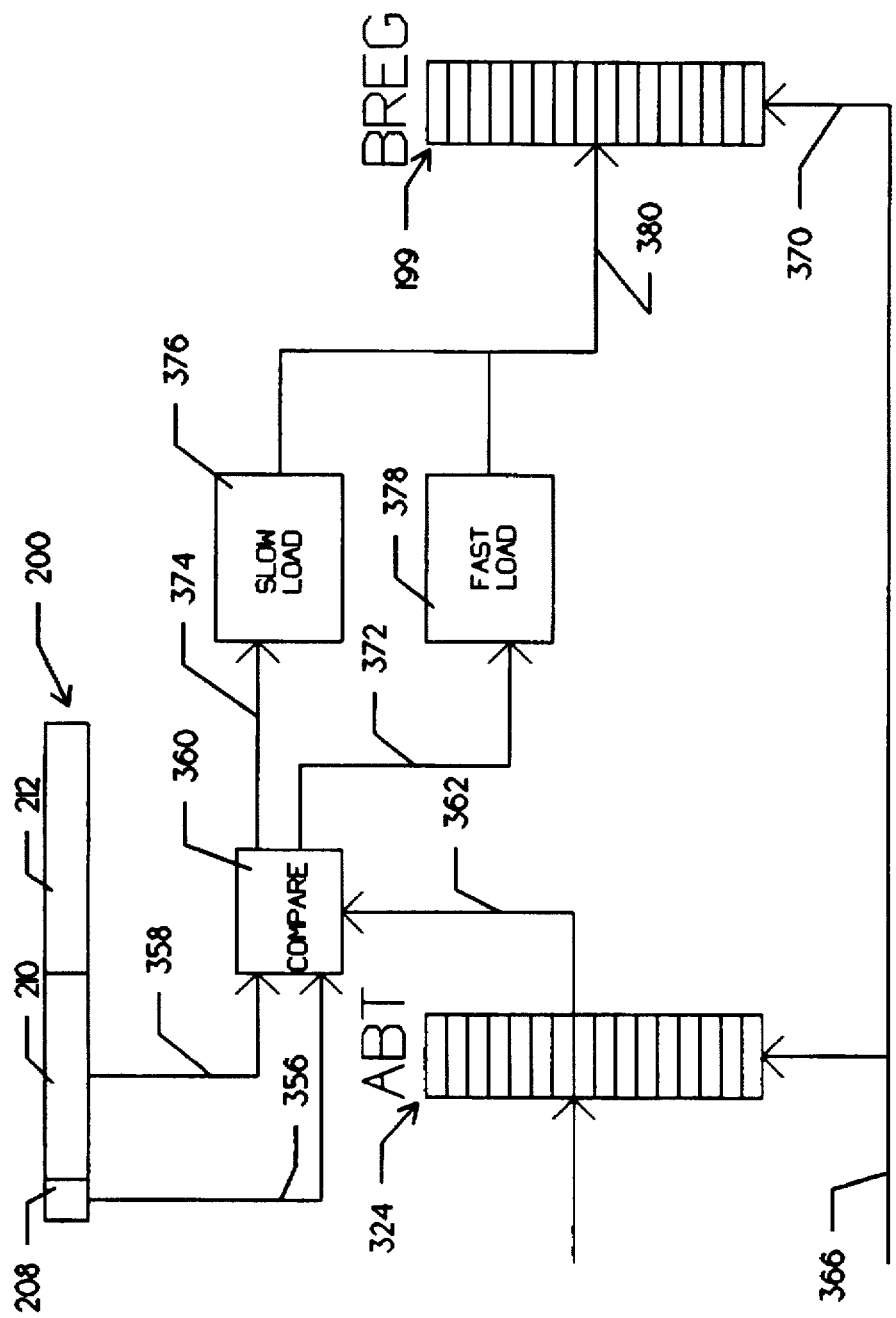
FIG. 12 is a schematic diagram showing how the decision is made to employ the fast or slow user base register load.

FIG. 12 is a schematic diagram showing selection of one of the two alternative methods of updating a base register. The virtual address 20Q is retrieved using the operand of the load user base register instruction. L field 208 and BDI field 210 are supplied to comparator 360 by cables 356 and 358, respectively. Active base table 324 is accessed using the designation of the base register to be modified supplied via cable 366. As the new virtual address is entered into the appropriate location of active base table 324, the previous contents are supplied to comparator 360 via cable 362. Comparator 360 compares the L and BDI fields of the previous entry with those of the new virtual address 200. If equal, fast load logic 378 is selected via cable 372. If unequal, slow load logic 376 is selected via cable 374.

Fast load logic 378 computes the new value to be stored within the appropriate base register. This value may be conveniently determined in several ways. In a first approach, the bank descriptor (i.e. absolute address for the initial location of the bank) may be saved from the previous loading of the base register. This requires sufficient random access storage to hold the bank descriptor relative to the base register designation to save the time needed to access the corresponding bank descriptor table. In this embodiment, the new Offset is added to the previous bank descriptor with the sum loaded into the base register.

In an alternative embodiment, fast load logic 378 subtracts the previous offset from the future offset. This difference is added to the current absolute address of the base register to be modified via cable 380. The base register is selected by cable 370. For either embodiment, no further memory accesses or computations are required resulting in a substantial performance enhancement.

Slow load logic 376 discards the previous virtual address and performs the loading of the selected base register in accordance with the previous description (see FIG. 11). With either slow load or fast load, the relative limits must be set.

Figure 13:
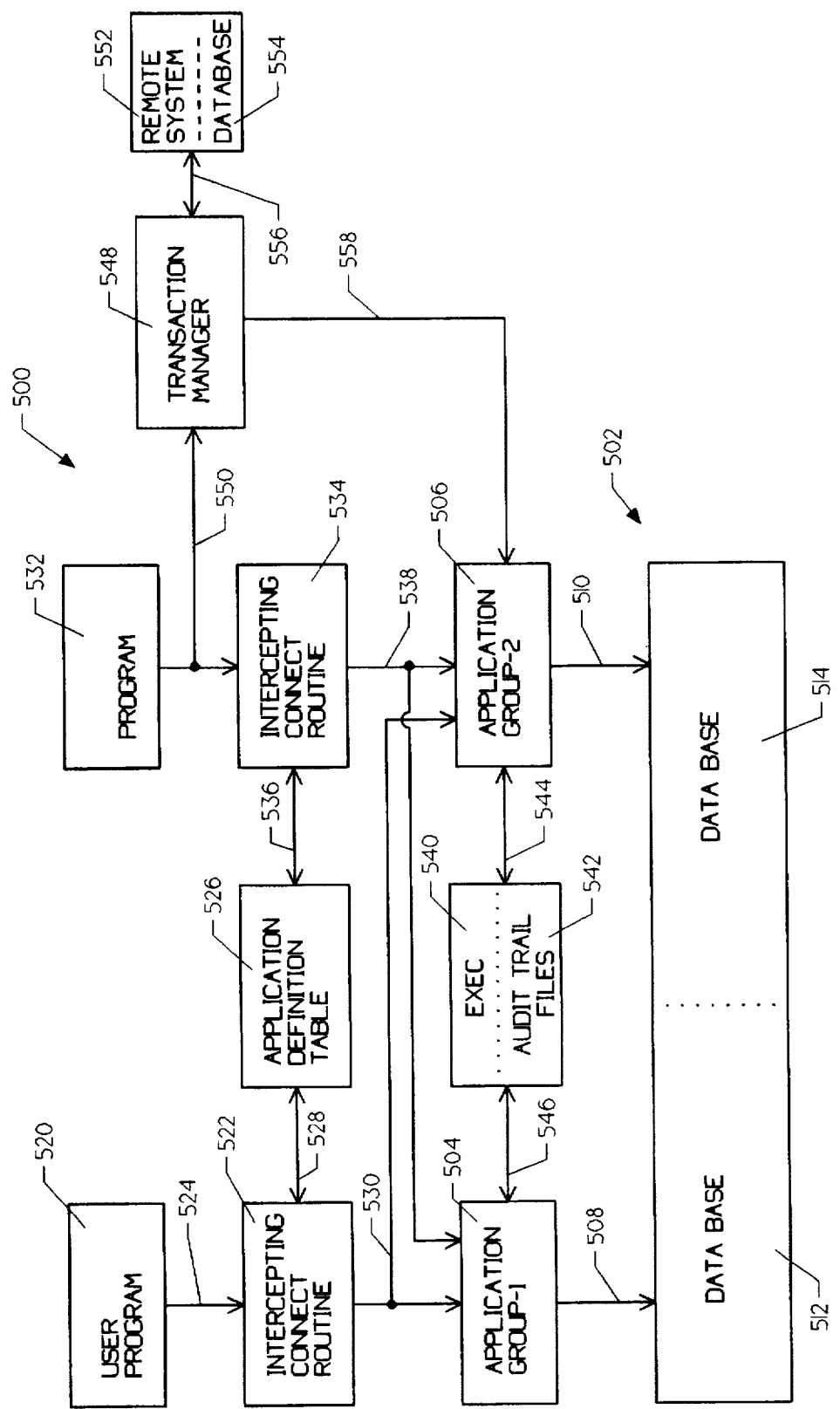
FIG. 13 is a block diagram showing an exemplary embodiment of the present invention.

FIG. 13 is a block diagram showing an exemplary embodiment of the present invention. The block diagram is generally shown at 500. As described above, the data processing system 10 may have a user program which access a local and a remote data base. For example, instruction processors 14 and 16 of storage controller 12 may access any of the data bases stored in memory modules 22, 24, 56, 58, 60, 62, 64, and 66, via interfaces 68, 70, 72, 74, 76, and 78. A user program may provide a local transaction to a local data base and a global transaction to a remote data base.

An exemplary embodiment of the present invention provides a method and apparatus for allowing a user program, which has provided a global transaction to a remote data base, to continue operation after only a partial recovery, thereby significantly reducing the delay associated with a detected fault or failure. That is, a first portion of a data base, which may correspond to local data base transactions, may be recovered and released very quickly. Thereafter, the corresponding global transactions may be recovered in due course, being limited by the communication link with the remote data base. In this configuration, the user program may gain access to most of the data base, except the portion that corresponds to the global transactions, immediately after the local data base transactions have been recovered. Since recovery of the global transactions may be the most time consuming, the present invention may significantly reduce the delay between a detected fault and the time that a user program may gain access to the affected data base.

In an exemplary embodiment, the state of all local transactions may be maintained in an audit trail file by an executive program, thus allowing the local transactions to be recovered by the local system. The executive may also maintain the state of all global transactions by indicating a "ready" state if a remote system had already started processing a corresponding global transaction step. For all global transaction steps in a "ready" state, a data base management system may re-establish the local data base locks and system environment variables associated therewith. Thereafter, the user programs may continue operation and may access the un-locked portion of the date base. In the meantime, a transaction manager may determine the actual state of the global transactions by performing the necessary communications with the remote system(s). Once the actual state of a particular global transaction is determined by the transaction manager, the global transaction may be either rolled forward or rolled back, as discussed above, and the corresponding data base locks may be released. As the transaction manager determines the actual state of the remaining global transactions, more of the data base may be released to the user programs. Eventually, the entire data base may be available to the user programs.

Referring specifically to FIG. 13, a first user program 520 and a second user program 532 may be executed on data processing system 10. First user program 520 may access one or more data bases through a number of "application groups". An application group is a logical partition of the exemplary computer system wherein each of the application groups can be independently recovered following a system fault. In the exemplary embodiment, an application group-1 504 and an application group-2 506 may be provided. It is contemplated that any number of application groups may be provided within a computer system.

Each user program 520 and 532 may be mapped to at most one application group 504 or 506. However, it is recognized that the present invention is not limited to such a configuration. The mapping of the first user program 520 and second user program 532 to the application groups 504 and 506 may be controlled by an intercept and connect routine. First user program 520 may be coupled to an intercept connect routine 522 via interface 524. Second user program 532 may be coupled to intercept connect routine 534 via interface 550. When a user program makes a request for access to a program group data base which is a partition of system data base 502, the corresponding intercept and connect routine may determine which application group should be assigned thereto by consulting an application definition table 526. That is, intercept connect routine 522 may determine which of the application groups 504 or 506 to assign to user program 520. Intercept connect routine 522 may consult application definition table 526 via interface 530 to help determine the appropriate application group. Similarly, intercept connect routine 534 may determine which of the application groups 504 or 506 to assign to user program 532. Intercept connect routine 534 may consult application definition table 526 via interface 538 to help determine the appropriate application group.

Application definition table 526 may contain predetermined information about each application group including, but not limited to, the memory locations assigned thereto, etc. In this configuration, one application group may be configured to support a large user program having large memory requirements, while another application group may be configured to support a small user program. In this way, user program requirements may be matched to a suitable application group thereby minimizing the amount of wasted system resources. After the intercept and connect routines 522 and 534 make the application group assignments, user programs 520 and 532 may access the system data base 502 via the assigned application group for the duration of the corresponding user program's execution.

Application group-1 504 may be coupled to the program group-1 partition 512 of data base 502 via interface 508 and may be further coupled to an executive 540 via interface 546. Similarly, Application group-2 506 may be coupled to the program group-2 partition 514 of data base 502 via interface 510 and may be further coupled to the executive 540 via interface 544. Executive 540 may maintain an audit trail file 542 per application group for all local and global data base transactions.

In the exemplary embodiment, user program 532 is permitted to access a remote data base. That is, user program 532 may be coupled to transaction manager 548 via interface 550. Transaction manager 548 may be coupled to a remote system 552 having a remote data base 554 via interface 556. Transaction manager 548 may further be coupled to application group-2 506 via interface 558. It is recognized that this is only an exemplary embodiment, and that any number of user programs may access a remote computer system and/or a remote data base. Consistent therewith, it is recognized that transaction manager 548 may be coupled to user program 520 and/or application group-1 504.

Figure 14:
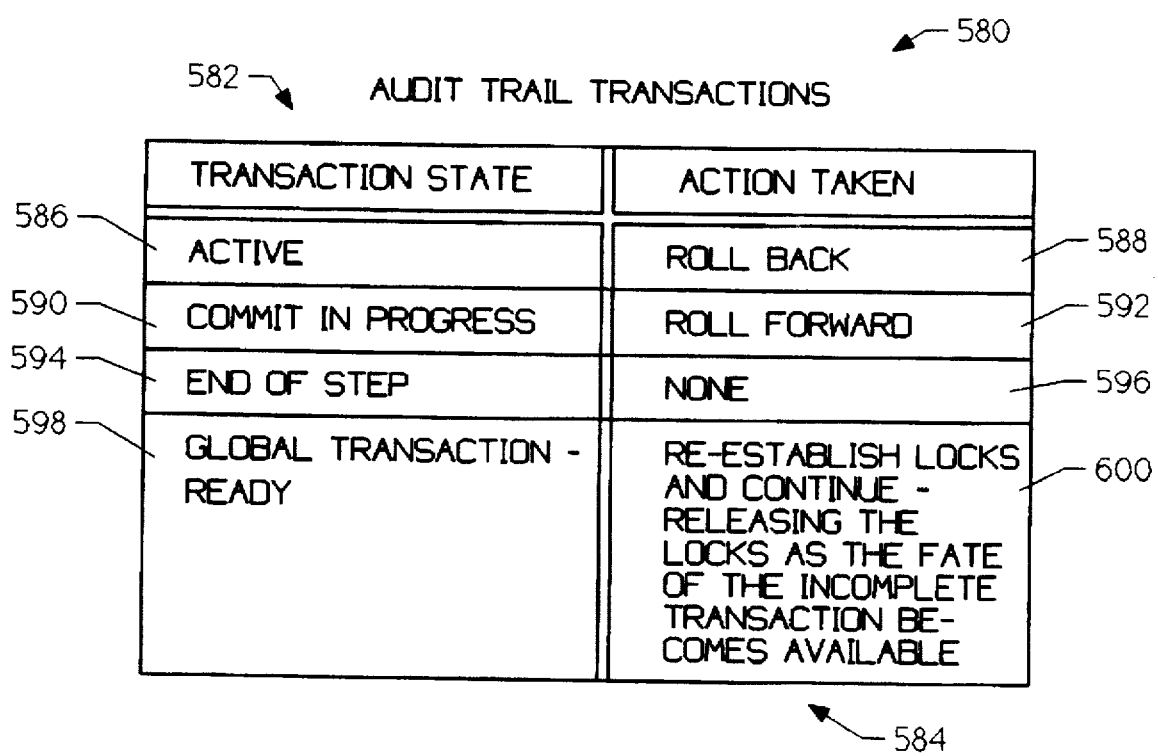
FIG. 14 is a table showing a number of exemplary transaction states that may be maintained by the audit trail file of the exemplary embodiment shown in FIG. 13.

FIG. 14 is a table showing a number of exemplary transaction states that may be maintained by the audit trail file 542 of the exemplary embodiment shown in FIG. 13. The table is generally shown at 580. A first column 582 of table 580 contains the various transaction states that may be maintained. A second column 584 of table 580 briefly describes an exemplary action that may be taken, for each of the corresponding states shown in the first column 582 of table 580. It is recognized that other states may be maintained, and that other actions may be taken, and still be within the scope of the present invention.

During normal operation, the executive 540 may record the status of each data base transaction in audit trail file 542. For local transaction steps, the status may include an "active" state 586, a "commit in progress" state 590, and an "end of step" state 594. When a fault is detected in a corresponding application group 504 and/or 506, the recorded status may be used to determine the fate of an incomplete transaction step. For example, if the fault occurred when a corresponding transaction step was in the "active" state 586, indicating that the transaction step was currently being processed, the transaction step may be rolled back so that the data base may look as if the step had never been processed, as shown at 588. This may be accomplished by consulting the audit trail file 542 and by reversing any intermediate changes indicated therein. If the fault occurred when a transaction step was in the "commit in progress" state 590, indicating that the transaction step had reached a point where the updates had been saved, the corresponding step may be rolled forward so that the data base may look as if the step had been completed successfully, as shown at 592. Finally, if the fault occurred when a transaction step was in an "end of step" state 594, indicating the transaction step had been completed, no action may be required, as shown at 596. Every transaction step that was in progress at the time of the fault may be addressed in this manner before any further transactions may access the data base via a corresponding application group. This may be necessary to maintain data coherency, and may further allow the user program to be restarted at a point which corresponds to just prior to the detection of the fault.

As discussed above, some of the transaction steps may be global transaction steps. That is, some of the transaction steps may include updates to various remote data bases. Further, each of the global transactions may have a related portion in the local data base. For example, the user program may calculate the contents of a particular local data base location based upon the contents of a remote data base location. Global transaction steps generally cannot be recovered until the actual state thereof can be determined. In the exemplary embodiment, the executive 540 may maintain a record of whether each global transaction is in a "ready" state, as shown at 598, indicating that the corresponding remote system had started processing the particular global transaction step at the time the fault occurred.

A global transaction step that was interrupted in the "ready" state may not be handled immediately because communication with a remote system may be required to determine how to proceed 600. Instead, the local computer system may re-establish the data base locks and system environment variables assusinged therewith. This may be accomplished by using the access lock field discussed with reference to FIGS. 9 and 10 above. Thereafter, the user programs 520 and 532 may continue operation and may access the un-locked portion of the data base 502. That is, the user programs 520 and 532 may be allowed to access corresponding application groups 504 and 506 after only a partial data base recovery. In the meantime, transaction manager 548 may determine the actual state of the global transactions by performing the necessary communications with the remote system 552. That is, the transaction manager 548 may determine whether a corresponding global transaction step was in an "active" state 586, a "commit in progress" state 590, or an "end of step" state 594. Once the actual state of a particular global transaction step is determined, the global transaction step may be either rolled forward or back, as discussed above, and the corresponding data base locks may be released. As the transaction manager 548 determines the actual state of the global transactions, more of the data base 502 may be released to the user programs 520 and 532. Eventually, the entire data base 502 may be available to the user programs 520 and 532.

Figure 15A:
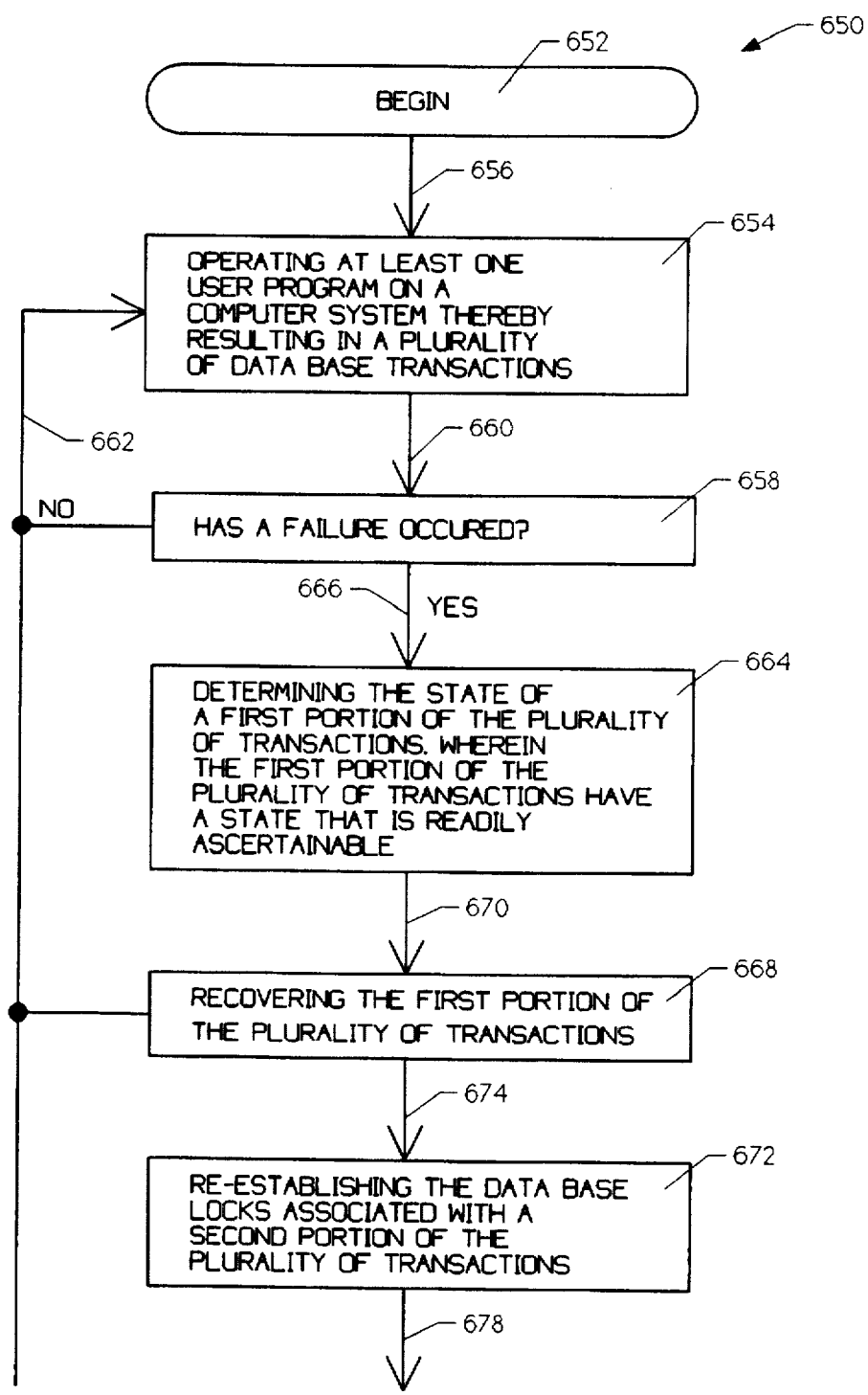
FIGS. 15A–15B comprise a first flow diagram showing an exemplary method of the present invention.
Figure 15B:
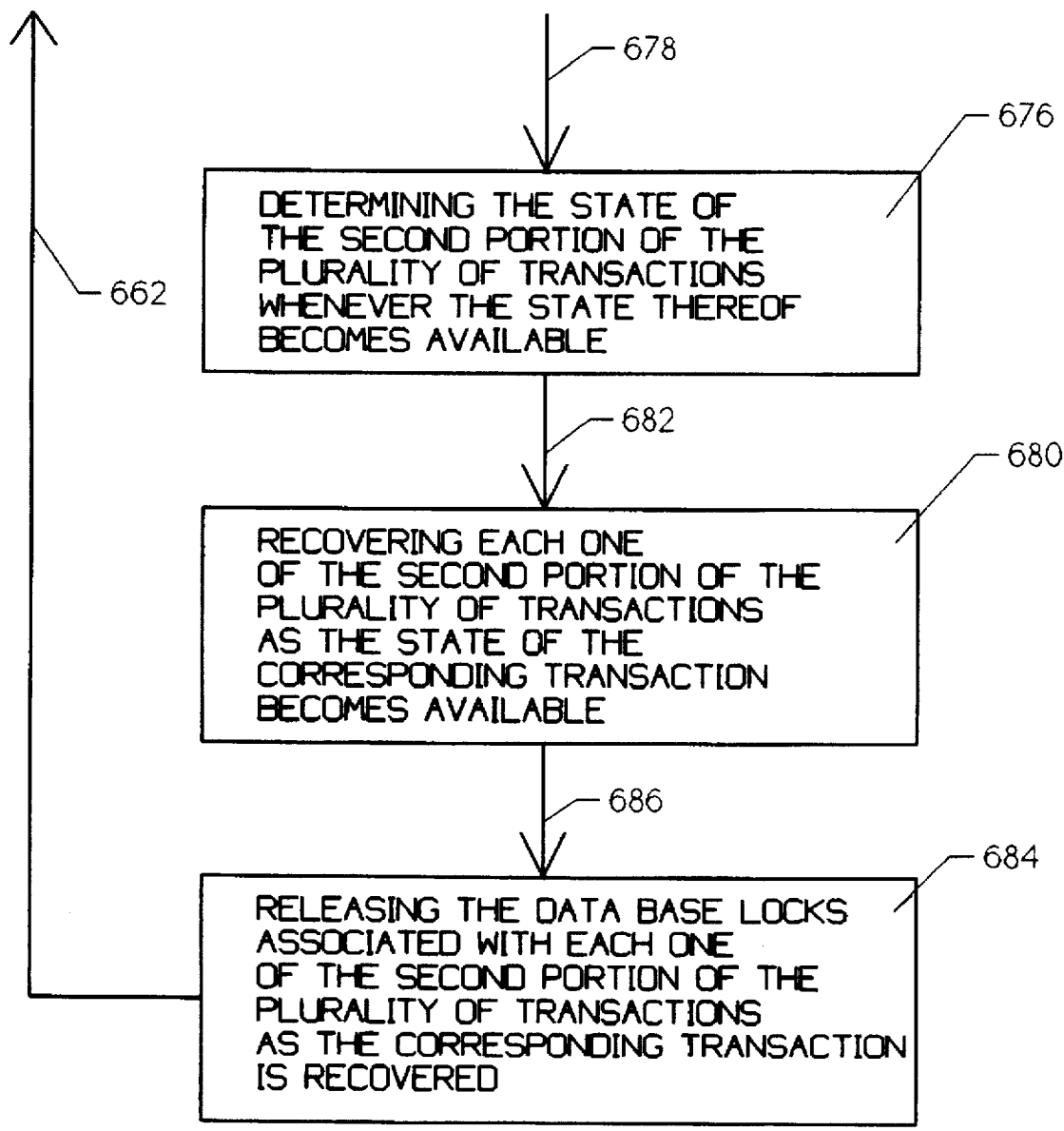

FIGS. 15A–15B comprise a first flow diagram showing an exemplary method of the present invention. The flow diagram is generally shown at 650. The method is entered at element 652 wherein control is passed to element 654 via interface 656. Element 654 operates at least one user program on a computer system, thereby resulting in a plurality of database transactions. Control is then passed to element 658 via interface 660. Element 658 determines whether a failure has occurred. If a failure has not occurred, control is passed back to element 654 via interface 662. If a failure has occurred, control is passed to element 664 via interface 666. Element 664 determines the state of a first portion of the plurality of transactions, wherein the first portion of the plurality of transactions have a state that is ascertainable at the time of the fault. Control is then passed to element 668 via interface 670. Element 668 recovers the first portion of the plurality of transactions.

Control is then passed back to element 654 via interface 662. Simultaneously therewith control is passed to element 672 via interface 674. Element 672 reestablishes the database locks associated with a second portion of the plurality of transactions, wherein the second portion of the plurality of transactions have a state that is not ascertainable at the time of the fault. Control is then passed to element 676 via interface 678. Element 676 determines the state of the second portion of the plurality of transactions whenever the state thereof becomes available. Control is then passed to element 680 via interface 682. Element 680 recovers each one of the second portion of the plurality of transactions as the state of the corresponding transaction becomes available. Control is then passed to element 684 via interface 686. Element 684 releases the database locks associated with each one of the transactions of the second portion of the plurality of transactions as the corresponding transaction is recovered by element 680. Control is then passed back to element 654 via interface 662.

Figure 16A:
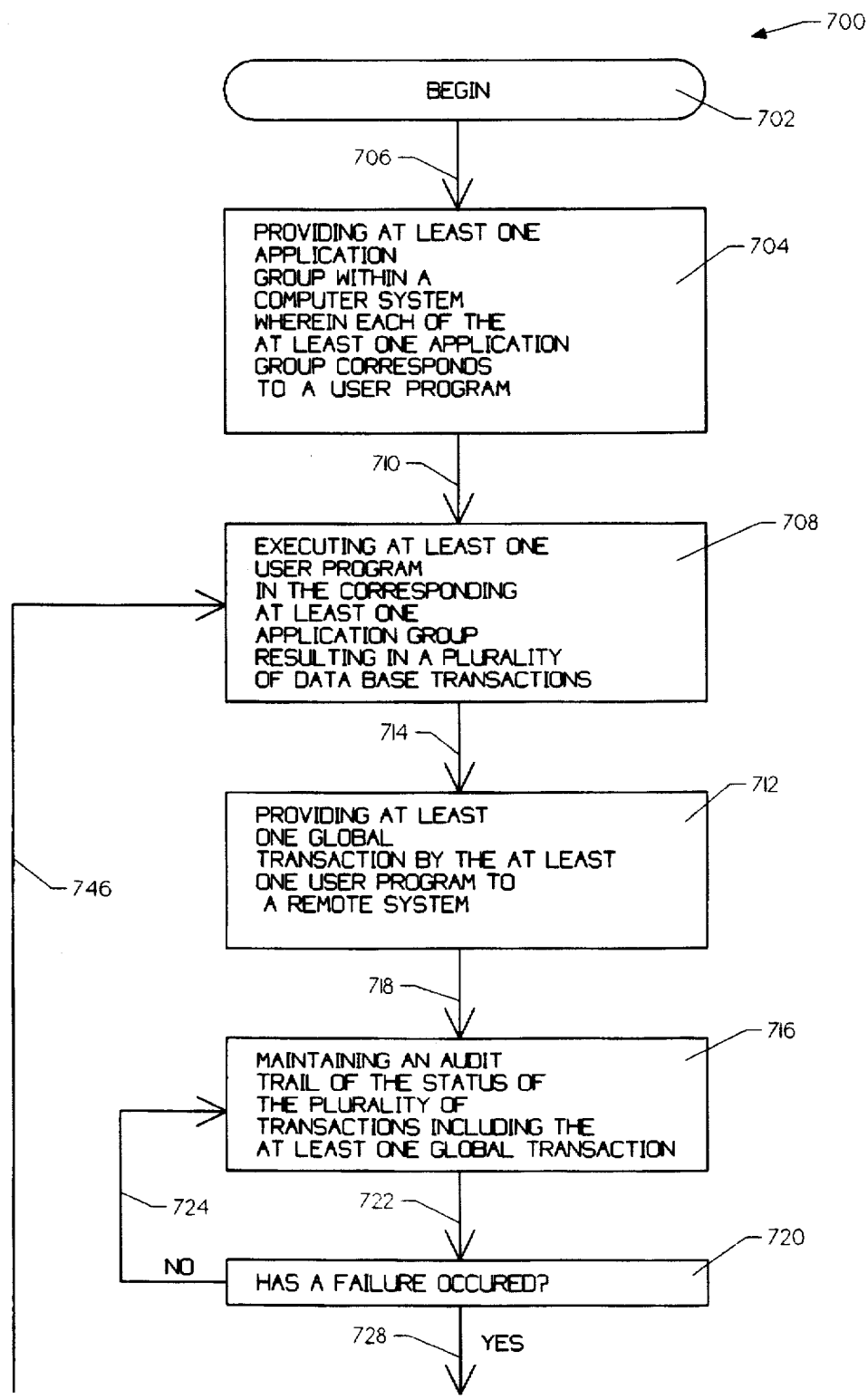
FIGS. 16A–16C comprise a second flow diagram showing another exemplary method of the present invention.
Figure 16B:
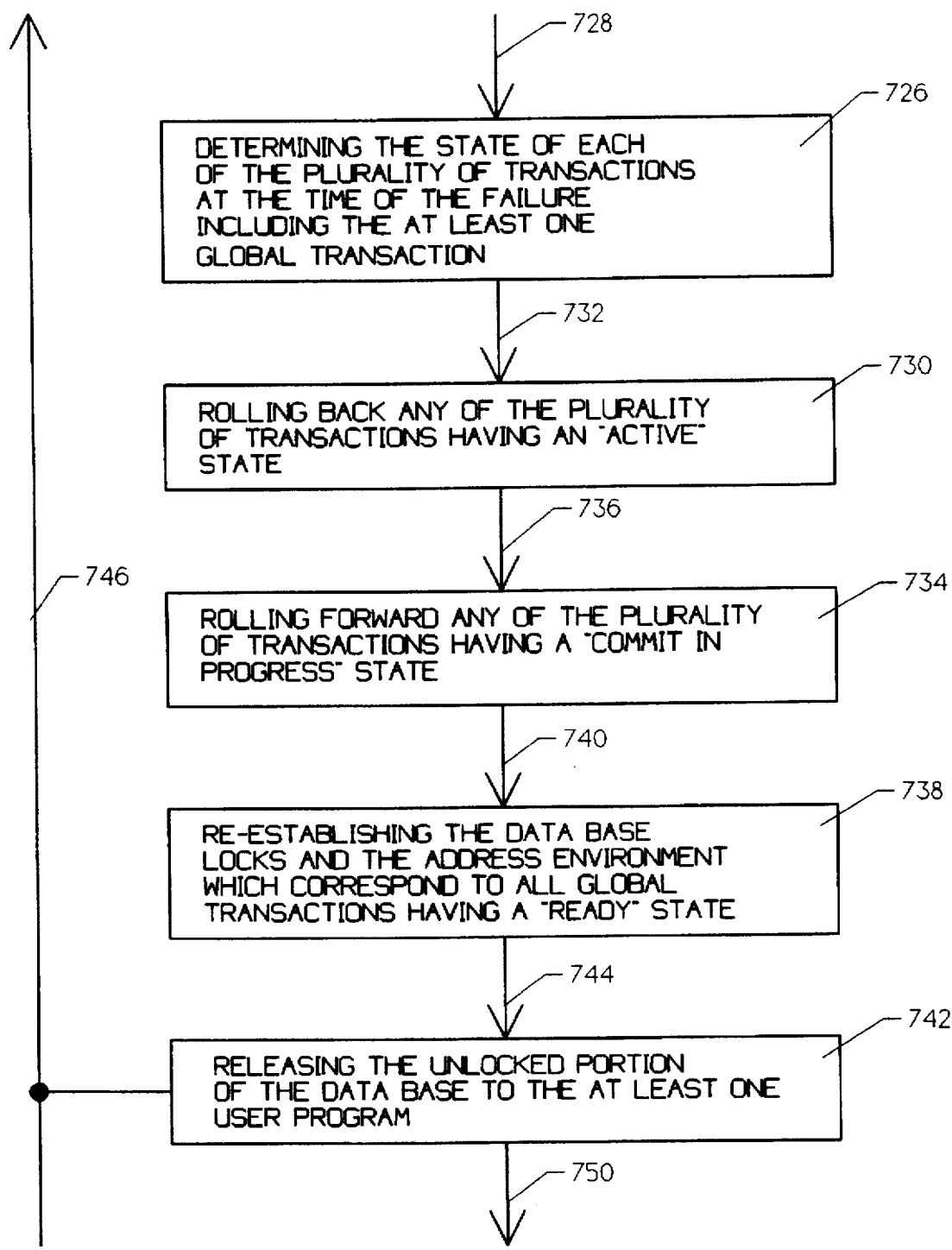
Figure 16C:
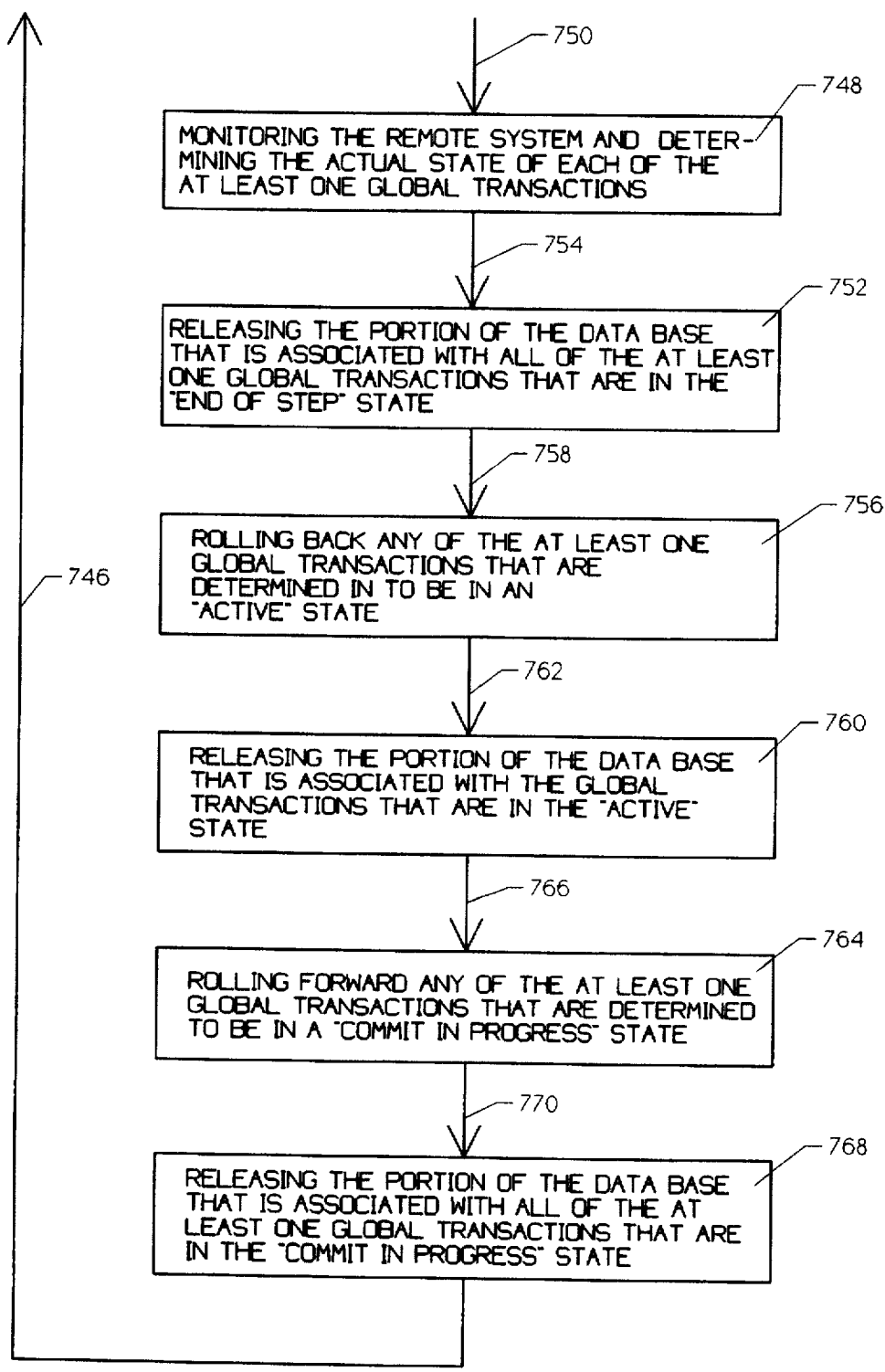

FIGS. 16A–16C comprise a second flow diagram showing another exemplary method of the present invention. The flow diagram is generally shown at 700. The method is entered at element 702, wherein control is passed to element 704 via interface 706. Element 704 provides at least one application group within a computer system wherein each of the at least one application group corresponds to a user program. Control is then passed to element 708 via interface 710. Element 708 executes at least one user program in the corresponding at least one application group resulting in a plurality of database transactions. Control is then passed to element 712 via interface 714. Element 712 provides at least one global transaction by the at least one user program to a remote data base. The at least one global transaction may have a related portion in the local data base. For example, the user program may calculate the contents of a particular local data base location based upon the contents of a remote data base location.

Control is then passed to element 716 via interface 718. Element 716 maintains an audit trail of the status of the plurality of transactions including the at least one global transaction. Control is then passed to element 720 via interface 722. Element 720 determines whether a failure has occurred. If a failure has not occurred, control is passed back to element 716 via interface 724. If a failure has occurred, control is passed to element 726 via interface 728. Element 726 determines the state of each of the plurality of transactions at the time of the failure including the at least one global transaction. Control is then passed to element 730 via interface 732. Element 730 rolls back any of the plurality of transactions having an "active" state. Control is then passed to element 734 via interface 736. Element 734 rolls forward any of the plurality of transactions having a "commit in progress" state. Control is then passed to element 738 via interface 740. Element 738 reestablishes the database locks and the address environment which correspond to all global transactions having a "ready" state. Control is then passed to element 742 via interface 744. Element 742 releases the unlocked portion of the database to the at least one user program. Control is then passed simultaneously back to element 708 via interface 746 and to element 748 via interface 750.

Referring to element 748, element 748 monitors the remote system and determines the actual state of each of the at least one global transactions. Control is then passed to element 752 via interface 754. Element 752 releases the portion of the database that is associated with all of the at least one global transactions that are in the "end of step" state. Control is then passed to element 756 via interface 758. Element 756 rolls back any of the at least one global transactions that are determined to be in an "active" state. Control is then passed to element 760 via interface 762. Element 760 releases the portion of the database that is associated with the global transactions that are in the "active" state. Control is then passed to element 764 via interface 766. Element 764 rolls forward any of the at least one global transactions that are determined to be in a "commit in progress" state. Control is then passed to element 768 via interface 770. Element 768 releases the portion of the database that is associated with all of the at least one global transactions that are in the "commit in progress state". Control is then passed back to element 708 via interface 746.

Having thus described the preferred embodiments of the present invention, those of skill in the art will readily appreciate that the teachings found herein may be applied to yet other embodiments within the scope of the claims hereto attached.

We claim:

1. A method for providing data base recovery to a data base within a computer system, the computer system executing at least one user program(s) wherein the at least one user program(s) provide a number of data base transactions to the data base, each of the number of data base transactions corresponding to a portion of the data base, the computer system experiencing a fault at a time, the method comprising the steps of:

a. recovering the portions of the data base which correspond to a first portion of the number of data base transactions, wherein each of said first portion of the number of data base transactions have a state that is ascertainable at the time of the fault;

b. releasing the portions of the data base recovered in step (a) for use by the at least one user program(s);

c. recovering the portions of the data base which correspond to a second portion of the number of data base transactions, wherein each of said second portion of the number of data base transactions have a state that is not ascertainable at the time of the fault, said recovering step (c) recovers each of the corresponding portions of the data base as the state of a corresponding one of the data base transactions of said second portion of the number of data base transactions becomes available; and d. releasing the portions of the data base recovered in step (c) for use by the at least one user program(s), said releasing step (d) releases each of the corresponding portions of the data base to the at least one user program(s) as the recovering step (c) makes a recovery of each of the data base transactions of said second portion of the number of data base transactions.

2. A method according to claim wherein the portions of the data base which correspond to said second portion of the number of data base transactions are locked initially.

3. A method according to claim 2 wherein said releasing step (d) unlocks the portions of the data base which correspond to the data base transactions recovered in step (c), the releasing step (d) unlocking the portions of the data base as the recovering step (c) makes a recovery of a corresponding one of the data base transactions.

4. A method according to claim 3 wherein said first portion of the number of data base transactions access a local data base.

5. A method according to claim 4 wherein said second portion of the number of data base transactions access a remote data base.

6. A method according to claim 5 wherein said remote data base is part of a remote computer system.

7. A method for providing data base recovery to a data base within a computer system, the computer system executing at least one user program(s) wherein the at least one user program(s) provides a number of data base transactions to the data base, the computer system experiencing a fault at a time, the method comprising the steps of:

a. recovering a first portion of the data base, wherein said first portion of the data base corresponds to a first portion of the number of data base transactions, said first portion of the number of data base transactions having a state that is ascertainable at the time of the fault;

b. releasing said first portion of the data base for use by the at least one user program(s);

c. recovering a second portion of the data base wherein said second portion of the data base corresponds to a second portion of the number of data base transactions, each of the data base transactions of said second portion of the number of data base transactions having a state that is not ascertainable at the time of the fault, said recovering step (c) recovering said second portion of the data base as the state of each of the data base transactions of said second portion of the number of data base transactions becomes available; and d. releasing said second portion of the data base for use by the at least one user program(s) as said recovering step (c) makes a recovery thereof.

8. A method according to claim 7 wherein said recovering step (a) locks said second portion of the data base.

9. A method according to claim 8 wherein said releasing step (d) unlocks said second portion of the data base for use by the at least one user program(s) as said recovering step (c) makes a recovery thereof.

10. A method according to claim 9 wherein said first portion of the data base corresponds to a local data base and said second portion of the data base corresponds to a remote data base.

11. A method according to claim 10 wherein said remote data base is part of a remote computer system.

12. A method for providing data base recovery to a local data base within a computer system, the computer system executing at least one user program(s) wherein the at least one user program(s) provides a number of local data base transactions to the local data base and at least one global data base transaction(s) to a remote data base, the number of local data base transactions each having an actual state and each of the at least one global transaction(s) having a state and an actual state, the at least one global data base transaction(s) being related to at least one corresponding portion(s) of the local data base, the method comprising the steps of:

a. detecting a fault in the computer system;

b. determining the actual state of the plurality of local data base transactions;

c. determining the state of the at least one global transaction(s);

d. recovering a first portion of the local data base wherein the first portion of the local data base corresponds to the plurality of local data base transactions;

e. locking the at least one corresponding portion(s) of the local data base which are related to the at least one global data base transaction(s), said locking step resulting in a locked portion of the local data base and an unlocked portion of the local data base;

f. releasing the unlocked portion of the local data base for use by the at least one user program(s);

g. determining the actual state of each of the at least one global transaction(s);

h. recovering each of the at least one corresponding portion(s) of the local data base as the determining step (g) determines the actual state of the corresponding at least one global transaction(s); and i. releasing each of the at least one corresponding portion (s) of the local data base as the recovering step (h) makes a recovery thereof.

13. A method for providing data base recovery to a local data base within a computer system, the computer system executing at least one user program(s) wherein the at least one user program(s) provides a number of local data base transactions to the local data base and at least one global data base transaction(s) to a remote data base, the number of local data base transactions each having an actual state and each of the at least one global transaction(s) having a state and an actual state, the at least one global data base transaction(s) being related to at least one corresponding portion(s) of the local data base, the method comprising the steps of:

a. maintaining an audit trail of the actual state of each of the number of local data base transactions and each of the at least one global data base transaction(s);

b. detecting a fault in the computer system;

c. determining the actual state of the plurality of local data base transactions and the state of the at least one global data base transaction(s) by querying the audit trail file;

d. rolling back any of the number of local data base transactions having an actual state of "active";

e. rolling forward any of the number of local data base transactions having an actual state of "commit in progress";

f. locking the at least one corresponding portion(s) of the local data base which correspond to the at least one global data base transactions thereby resulting in an unlocked portion of the local data base and a locked portion of the local data base;

g. releasing the unlocked portion of the local data base;

h. determining the actual state of each of the at least one global data base transactions;

i. releasing any of the at least one corresponding portion (s) of the local data base which correspond to any of the at least one global data base transactions having an actual state of "end of step";

j. rolling back any of the at least one global data base transactions having an actual state of "active";

k. releasing the at least one corresponding portion(s) of the local data base which correspond to the at least one global data base transactions that were rolled back in step (j);

l. rolling forward any of the at least one global data base transactions having an actual state of "commit in progress"; and m. releasing the at least one corresponding portion(s) of the local data base which correspond to the at least one global data base transactions that were rolled forward in step (1).

14. A method according to claim 13 wherein said audit trail is maintained by an executive within the computer system.

15. A method according to claim 14 wherein said determining step (h) may comprise a transaction manager.

16. A method according to claim 15 wherein said transaction manager is coupled to the remote data base.

17. A method according to claim 16 wherein said transaction manager performs the required communication with the remote data base to determine the actual state of the at least one global data base transaction(s).

18. A method according to claim 17 wherein the computer system has at least one application group for running the at least one user program(s).

* * * * *